United States Patent
Huang et al.

(10) Patent No.: US 12,126,418 B2
(45) Date of Patent: Oct. 22, 2024

(54) INTER-STREAM INTERFERENCE MEASUREMENT FOR NON-LINEAR PRECODING TECHNIQUES

(71) Applicant: QUALCOMM Incorporated, San Diego, CA (US)

(72) Inventors: Min Huang, Beijing (CN); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/002,797

(22) PCT Filed: Sep. 2, 2020

(86) PCT No.: PCT/CN2020/112950
§ 371 (c)(1),
(2) Date: Dec. 21, 2022

(87) PCT Pub. No.: WO2022/047642
PCT Pub. Date: Mar. 10, 2022

(65) Prior Publication Data
US 2023/0246691 A1    Aug. 3, 2023

(51) Int. Cl.
*H04B 7/06* (2006.01)
*H04B 7/0456* (2017.01)
(Continued)

(52) U.S. Cl.
CPC ......... *H04B 7/0632* (2013.01); *H04B 7/0456* (2013.01); *H04B 7/0626* (2013.01);
(Continued)

(58) Field of Classification Search
CPC .... H04B 7/0456; H04B 7/046; H04B 7/0473; H04B 7/0486; H04B 7/0626;
(Continued)

(56) References Cited

U.S. PATENT DOCUMENTS

| 2018/0097548 A1* | 4/2018 | Kim | H04B 7/0478 |
| 2018/0212662 A1* | 7/2018 | Ren | H04B 7/0634 |

(Continued)

FOREIGN PATENT DOCUMENTS

| CN | 108111197 A | 6/2018 |
| CN | 109428624 A | 3/2019 |
| WO | WO-2019140610 A1 | 7/2019 |

OTHER PUBLICATIONS

International Search Report and Written Opinion—PCT/CN2020/112950—ISA/EPO—May 31, 2021.

(Continued)

*Primary Examiner* — Young T. Tse
(74) *Attorney, Agent, or Firm* — Holland & Hart LLP/Qualcomm Incorporated

(57) ABSTRACT

Methods, systems, and devices for wireless communications are described. In some systems, a base station may configure multiple types of resources at a user equipment (UE) for interference management processing at the UE in examples in which the base station employs a non-linear precoding technique. The multiple types of resources configured by the base station may include a first resource type configured for measuring channel gain at the UE, a second resource type configured for measuring non-linear interference at the UE arising from lower-layer data streams, and a third resource type configured for measuring linear interference at the UE arising from higher-layer data streams. The base station may transmit one or more reference signals to the UE over each of the multiple resource types and the UE may determine both a non-linear interference measurement and a linear interference measurement based on receiving the reference signals.

20 Claims, 16 Drawing Sheets

(51) Int. Cl.
    *H04L 25/02*    (2006.01)
    *H04L 27/26*    (2006.01)
(52) U.S. Cl.
    CPC ........ *H04L 25/0228* (2013.01); *H04L 27/261* (2013.01); *H04L 27/2691* (2013.01)
(58) Field of Classification Search
    CPC . H04B 7/0632; H04B 7/0634; H04L 25/0202; H04L 25/0224; H04L 25/0226; H04L 25/0228; H04L 25/0242; H04L 27/261; H04L 27/2691; H04L 27/2695
    USPC ........ 375/259, 260, 262, 265, 267; 370/328, 370/329, 332, 333; 455/500, 513, 517
    See application file for complete search history.

(56) References Cited

U.S. PATENT DOCUMENTS

| | | |
|---|---|---|
| 2019/0007181 A1 | 1/2019 | Marinier et al. |
| 2019/0319653 A1 | 10/2019 | Wyville et al. |
| 2021/0143870 A1* | 5/2021 | Faxér .................... H04L 5/0057 |

OTHER PUBLICATIONS

Qualcomm Inc: "Discussion on DM-RS Enhancements for FD-MIMO", 3GPP TSG-RAN WG1 #82bis, R1-155738, Oct. 5-9, 2015, Malmo, Sweden, pp. 1-5, The whole document.

* cited by examiner

INTER-STREAM INTERFERENCE MEASUREMENT FOR NON-LINEAR PRECODING TECHNIQUES

CROSS REFERENCE

The present Application is a 371 national stage filing of International PCT Application No. PCT/CN2020/112950 by Huang et al. entitled "INTER-STREAM INTERFERENCE MEASUREMENT FOR NON-LINEAR PRECODING TECHNIQUES," filed Sep. 2, 2020, which is assigned to the assignee hereof, and which is expressly incorporated by reference in its entirety herein.

TECHNICAL FIELD

The following relates to wireless communications, including inter-stream interference measurement for non-linear precoding techniques.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station may employ a linear-precoding technique to partially mitigate the influence of interference among signals or data streams that are transmitted over the same time and frequency resources by the base station. Linear-precoding techniques are limited, however, in scenarios in which a quantity of transmissions from the base station exceeds a quantity of an available set of orthogonal sequences. For example, using linear-precoding techniques, a quantity of signals or data streams (for example, that are transmitted over the same time and frequency resources) among which the base station may mitigate interference via precoding is less than or equal to a quantity of dimensions of the sequences of the linear-precoding techniques. In some cases, the base station may employ a non-linear precoding technique, which may mitigate interference among signals or data streams without being limited to the use of orthogonal sequences for each transmission from the base station. As such, the base station may employ a non-linear precoding technique to mitigate inference among a greater number of signals or data streams than could be achieved using a linear-precoding technique, which may result in greater throughput between the base station and each served user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication at a first UE. The method may include receiving, from a base station, a channel state information (CSI) resource configuration including an indication of a first resource and a second resource for non-linear interference management processing, receiving, from the base station over the first resource, a first reference signal associated with a first setting of a precoding filter and, from the base station over the second resource, a second reference signal associated with a second setting of the precoding filter and a third reference signal associated with a third setting of the precoding filter, the first setting of the precoding filter and the second setting of the precoding filter corresponding to a first layer associated with the first UE and the third setting of the precoding filter corresponding to a second layer associated with a second UE, the second layer being a lower layer than the first layer, determining, based on interference arising from the second layer associated with the second UE, an interference measurement at the first UE based on the first reference signal, the second reference signal, and the third reference signal, and communicating with the base station based on the interference measurement.

Another innovative aspect of the subject matter described in this disclosure can be implemented in an apparatus for wireless communication at a first UE. The apparatus may include a processor, memory coupled with the processor, and instructions stored in the memory. The instructions may be executable by the processor to cause the apparatus to receive, from a base station, a CSI resource configuration including an indication of a first resource and a second resource for non-linear interference management processing, receive, from the base station over the first resource, a first reference signal associated with a first setting of a precoding filter and, from the base station over the second resource, a second reference signal associated with a second setting of the precoding filter and a third reference signal associated with a third setting of the precoding filter, the first setting of the precoding filter and the second setting of the precoding filter corresponding to a first layer associated with the first UE and the third setting of the precoding filter corresponding to a second layer associated with a second UE, the second layer being a lower layer than the first layer, determine, based on interference arising from the second layer associated with the second UE, an interference measurement at the first UE based on the first reference signal, the second reference signal, and the third reference signal, and communicate with the base station based on the interference measurement.

Another innovative aspect of the subject matter described in this disclosure can be implemented in another apparatus for wireless communication at a first UE. The apparatus may include means for receiving, from a base station, a CSI resource configuration including an indication of a first resource and a second resource for non-linear interference management processing, receiving, from the base station over the first resource, a first reference signal associated with a first setting of a precoding filter and, from the base station over the second resource, a second reference signal associated with a second setting of the precoding filter and a third reference signal associated with a third setting of the precoding filter, the first setting of the precoding filter and the second setting of the precoding filter corresponding to a first layer associated with the first UE and the third setting of the precoding filter corresponding to a second layer associated with a second UE, the second layer being a lower layer than the first layer, determining, based on interference arising from the second layer associated with the second UE, an interference measurement at the first UE based on the first reference signal, the second reference signal, and the third reference signal, and communicating with the base station based on the interference measurement.

Another innovative aspect of the subject matter described in this disclosure can be implemented in a non-transitory computer-readable medium storing code for wireless communication at a first UE. The code may include instructions executable by a processor to receive, from a base station, a CSI resource configuration including an indication of a first resource and a second resource for non-linear interference management processing, receive, from the base station over the first resource, a first reference signal associated with a first setting of a precoding filter and, from the base station over the second resource, a second reference signal associated with a second setting of the precoding filter and a third reference signal associated with a third setting of the precoding filter, the first setting of the precoding filter and the second setting of the precoding filter corresponding to a first layer associated with the first UE and the third setting of the precoding filter corresponding to a second layer associated with a second UE, the second layer being a lower layer than the first layer, determine, based on interference arising from the second layer associated with the second UE, an interference measurement at the first UE based on the first reference signal, the second reference signal, and the third reference signal, and communicate with the base station based on the interference measurement.

In some examples of the method, apparatuses, and non-transitory computer-readable medium described herein, determining the interference measurement at the first UE based on the first reference signal, the second reference signal, and the third reference signal may include operations, features, means, or instructions for determining a first signal strength associated with the first reference signal based on receiving the first reference signal over the first resource, and determining a second signal strength associated with a combination of the second reference signal and the third reference signal based on receiving the second reference signal and the third reference signal over the second resource. In some examples, determining the interference measurement is based on the first signal strength and the second signal strength.

In some examples of the method, apparatuses, and non-transitory computer-readable medium described herein, determining the interference measurement further may include operations, features, means, or instructions for subtracting the first signal strength from the second signal strength.

In some examples of the method, apparatuses, and non-transitory computer-readable medium described herein, determining the interference measurement further may include operations, features, means, or instructions for determining an estimation result on an auxiliary matrix based on determining the second signal strength, and subtracting the estimation result from the second signal strength.

Some examples of the method, apparatuses, and non-transitory computer-readable medium described herein may further include operations, features, means, or instructions for determining a signal-to-interference-plus-noise ratio (SINR) based on the interference measurement, and determining a channel quality indicator (CQI) based on the SINR. In some examples, communicating with the base station is based on the CQI.

Some examples of the method, apparatuses, and non-transitory computer-readable medium described herein may further include operations, features, means, or instructions for transmitting, to the base station, a CSI report including the CQI based on the CSI resource configuration.

One innovative aspect of the subject matter described in this disclosure can be implemented in a method of wireless communication at a base station. The method may include determining a precoding filter of a non-linear precoding technique for precoding one or more data transmissions, a first setting of the precoding filter and a second setting of the precoding filter corresponding to a first layer associated with a first UE and a third setting of the precoding filter corresponding to a second layer associated with a second UE, the second layer being a lower layer than the first layer, transmitting, to the first UE, a CSI resource configuration including an indication of a first resource and a second resource for non-linear interference management processing at the first UE, transmitting, to the first UE over the first resource, a first reference signal associated with the first setting of the precoding filter and, to the first UE over the second resource, a second reference signal associated with the second setting of the precoding filter and a third reference signal associated with the third setting of the precoding filter, and receiving, from the first UE, a CSI report including a CQI, the CQI based on an interference measurement by the UE. In some examples, the interference measurement is based on the first reference signal, the second reference signal, and the third reference signal.

Another innovative aspect of the subject matter described in this disclosure can be implemented in an apparatus for wireless communication at a base station. The apparatus may include a processor, memory coupled with the processor, and instructions stored in the memory. The instructions may be executable by the processor to cause the apparatus to determine a precoding filter of a non-linear precoding technique for precoding one or more data transmissions, a first setting of the precoding filter and a second setting of the precoding filter corresponding to a first layer associated with a first UE and a third setting of the precoding filter corresponding to a second layer associated with a second UE, the second layer being a lower layer than the first layer, transmit, to the first UE, a CSI resource configuration including an indication of a first resource and a second resource for non-linear interference management processing at the first UE, transmit, to the first UE over the first resource, a first reference signal associated with the first setting of the precoding filter and, to the first UE over the second resource, a second reference signal associated with the second setting of the precoding filter and a third reference signal associated with the third setting of the precoding filter, and receive, from the first UE, a CSI report including a CQI, the CQI based on an interference measurement by the UE. In some examples, the interference measurement is based on the first reference signal, the second reference signal, and the third reference signal.

Another innovative aspect of the subject matter described in this disclosure can be implemented in another apparatus for wireless communication at a base station. The apparatus may include means for determining a precoding filter of a non-linear precoding technique for precoding one or more data transmissions, a first setting of the precoding filter and a second setting of the precoding filter corresponding to a first layer associated with a first UE and a third setting of the precoding filter corresponding to a second layer associated with a second UE, the second layer being a lower layer than the first layer, transmitting, to the first UE, a CSI resource configuration including an indication of a first resource and a second resource for non-linear interference management processing at the first UE, transmitting, to the first UE over the first resource, a first reference signal associated with the first setting of the precoding filter and, to the first UE over the second resource, a second reference signal associated with the second setting of the precoding filter and a third reference signal associated with the third setting of the precoding filter, and receiving, from the first UE, a CSI report including a CQI, the CQI based on an interference measurement by the UE. In some examples, the interference measurement is based on the first reference signal, the second reference signal, and the third reference signal.

Another innovative aspect of the subject matter described in this disclosure can be implemented in a non-transitory computer-readable medium storing code for wireless communication at a base station. The code may include instructions executable by a processor to determine a precoding filter of a non-linear precoding technique for precoding one or more data transmissions, a first setting of the precoding filter and a second setting of the precoding filter corresponding to a first layer associated with a first UE and a third setting of the precoding filter corresponding to a second layer associated with a second UE, the second layer being a lower layer than the first layer, transmit, to the first UE, a CSI resource configuration including an indication of a first resource and a second resource for non-linear interference management processing at the first UE, transmit, to the first UE over the first resource, a first reference signal associated with the first setting of the precoding filter and, to the first UE over the second resource, a second reference signal associated with the second setting of the precoding filter and a third reference signal associated with the third setting of the precoding filter, and receive, from the first UE, a CSI report including a CQI, the CQI based on an interference measurement by the UE. In some examples, the interference measurement is based on the first reference signal, the second reference signal, and the third reference signal.

In some examples of the method, apparatuses, and non-transitory computer-readable medium described herein, transmitting, over the second resource, the third reference signal may include operations, features, means, or instructions for transmitting a set of symbols of the third reference signal over a set of ports of the second resource, each symbol of the set of symbols corresponding to one port of the set of ports.

In some examples of the method, apparatuses, and non-transitory computer-readable medium described herein, the CSI resource configuration may include operations, features, means, or instructions for transmitting, to the first UE over the third resource, a fourth reference signal associated with a fourth setting of the precoding filter, the fourth setting of the precoding filter corresponding to a third layer associated with a third UE and the third layer being a higher layer than the first layer.

Some examples of the method, apparatuses, and non-transitory computer-readable medium described herein may further include operations, features, means, or instructions for determining a modulation and coding scheme (MCS) based on the CQI, and transmitting, to the first UE, a data signal using the second setting of the precoding filter and the MCS.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1:
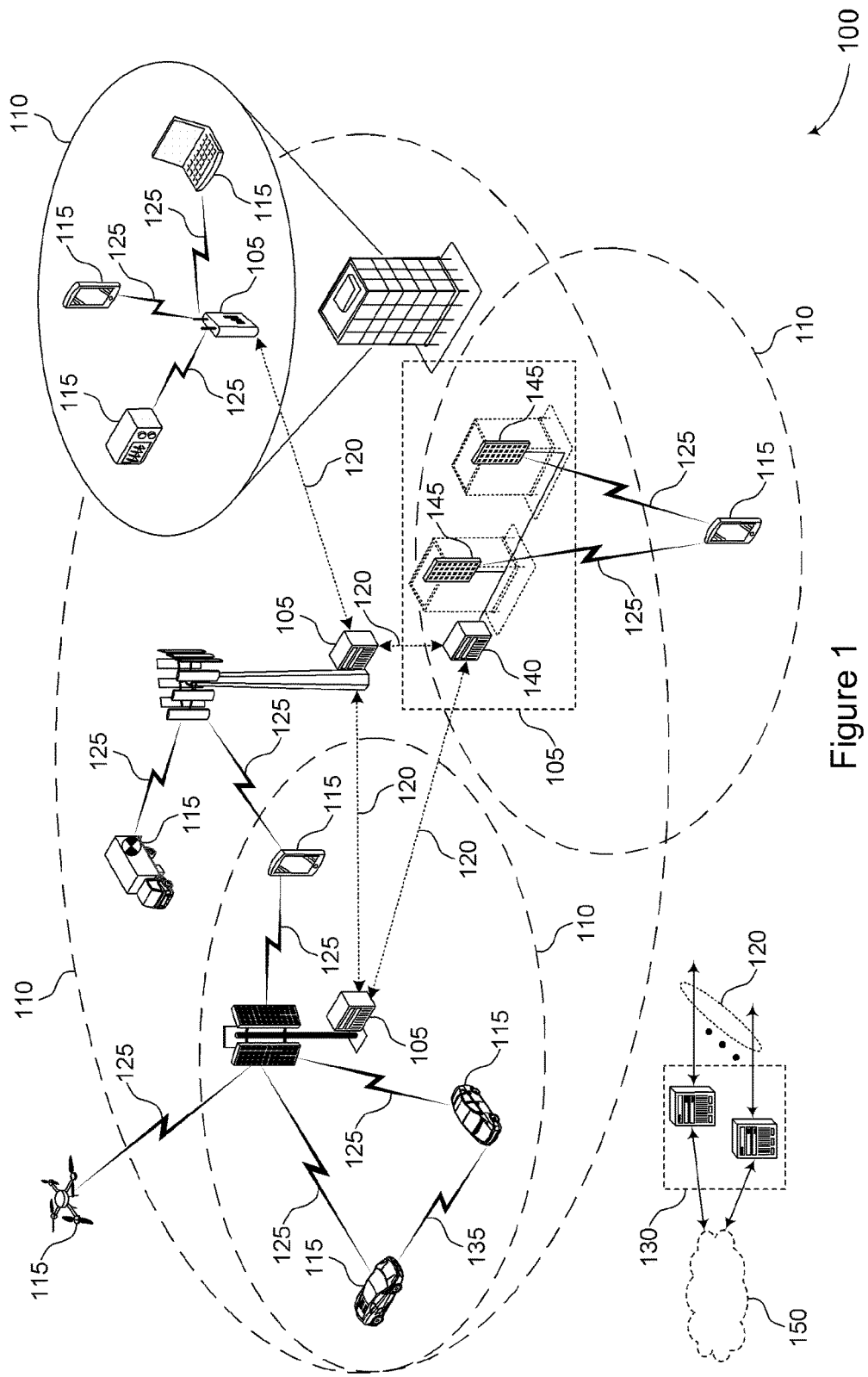
FIGS. 1 and 2 illustrate example wireless communications systems that support inter-stream interference measurement for non-linear precoding techniques in accordance with aspects of the present disclosure.

The following description is directed to particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO.

Various implementations relate generally to interference measurement at a user equipment (UE) using reference signals that are transmitted by a base station over multiple layers using a non-linear precoding technique. Some implementations more specifically relate to a configuration of multiple types of resources by the base station over which the base station may transmit reference signals to the UE. In some examples, the multiple types of resources may include a first resource type for measuring channel gain at the UE, a second resource type for measuring non-linear interference arising from lower-layer data streams at the UE, and a third resource type for measuring linear interference arising from higher-layer data streams at the UE. The base station may signal such a resource configuration to the UE to inform the UE to monitor each of the multiple types of resources for one or more reference signals and to configure the UE to determine a non-linear interference measurement associated with interference arising from lower-layer data streams or a linear interference measurement associated with interference arising from higher-layer data streams, or both, based on the received one or more reference signals and the configured resource types.

For example, the base station may transmit a first reference signal associated with a first setting of a precoding filter to the UE over a first resource of the first resource type and, based on the resource configuration, the UE may measure the channel gain based on the first reference signal. Additionally, in some examples, the base station may transmit a second reference signal associated with a second setting of the precoding filter and a third reference signal associated with a third setting of the precoding filter to the UE over a second resource of the second resource type and, based on the resource configuration, the UE may determine an interference measurement arising from non-linear interference associated with a lower-layer data stream based on the second reference signal and the third reference signal. In some implementations, the UE may determine the interference measurement based on determining a first signal strength associated with the first reference signal (which may be the same as or based on the measured channel gain), determining a second signal strength associated with a combination of the second reference signal and the third reference signal, and subtracting the first signal strength from the second signal strength. Additionally, in some examples, the base station may transmit a fourth reference signal associated with a fourth setting of the precoding filter to the UE over a third resource of the third resource type and, based on the resource configuration, the UE may determine an interference measurement arising from linear interference associated with a higher-layer data stream based on the fourth reference signal. The UE, based on determining the interference arising from both lower-layer data streams (which may cause non-linear interference) and higher-layer data streams (which may cause linear interference), may determine a signal-to-interference-plus-noise ratio (SINR), may determine a channel quality indicator (CQI) based on the determined SINR, and may transmit a CSI report to the base station including the CQI. The base station may use the received CQI to determine a modulation and coding scheme (MCS) to use for transmitting data to the UE.

Particular implementations of the subject matter described in this disclosure can be implemented to realize one or more of the following potential advantages. In some implementations, the described techniques can be used to provide for the measurement of interference at the UE arising from lower-layer data streams and higher-layer data streams that are precoded according to a non-linear precoding technique. As such, the UE may determine and report, to the base station, a CQI that is more representative of the actual interference (including both interference arising from lower-layer streams and higher-layer streams) experienced at the UE than the UE would otherwise be able to determine and report (such as without the configured resource types for non-linear and linear interference measurement). The base station may use the more accurate CQI to determine a more optimal transport format (such as a more optimal MCS) for data transmissions to the UE, which may result in improved channel robustness and an increased likelihood for successful communications between the base station and the UE. Likewise, based on enhancing the likelihood for successful communications between the base station and the UE using the non-linear precoding technique, the described techniques can be used to achieve a higher data rate and greater system throughput, which may improve system capacity, spectral efficiency, and, in some examples, reduce latency, among other benefits.

FIG. 1 illustrates an example of a wireless communications system 100 that supports inter-stream interference measurement for non-linear precoding techniques in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology. A "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier. In some cases, the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported. A numerology may include a subcarrier spacing ($\Delta f$) and a cyclic prefix. A carrier may be divided into one or more BWPs having the same or different numerologies. In some examples, a UE 115 may be configured with multiple BWPs.

In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, such that $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode if not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. If operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) if receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low SNR conditions). In some examples, a device may support same-slot HARQ feedback. In some examples, the device may provide HARQ feedback in a specific slot for data received in a previous symbol in the slot. In some other examples, the device may provide HARQ feedback in a subsequent slot, or according to some other time interval.

In some cases, a base station 105 may employ a non-linear precoding technique to mitigate interference among data streams without being limited to the use of orthogonal sequences for each transmission from the base station 105, as may be the case in cases in which the base station 105 employs a linear precoding technique. As such, the base station 105 may mitigate inference (via precoding) among a greater number of data streams than could be achieved using a linear-precoding technique, which may result in greater throughput between the base station 105 and each UE 115 served by the base station 105. In some cases, the non-linear precoding technique employed by the base station 105 may be based on one or more filters, such as a forward filter and a backward filter, that the base station 105 may generate based on an aggregated channel matrix of the UEs 115 served by the base station 105. The base station 105 may precode a number of data streams for a corresponding number of UEs 115 based on the forward filter and the backward filter. In some cases, however, the aggregated channel matrix used by the base station 105 to generate the forward filter and the backward filter may include an error (for example, may include some error relative to the true channel matrixes of the served UEs 115), and such error may propagate to the forward filter and the backward filter.

As such, a data stream transmitted by the base station 105 based on the forward filter and the backward filter may suffer from interference from both lower-layer data streams and higher-layer data streams. In some cases, the base station 105, based on using the non-linear precoding technique, may employ the use of linear processing for interference cancelation from higher-layer data streams and the use of non-linear processing for interference cancelation from lower-layer data streams. Accordingly, a receiving UE 115 may employ the use of linear interference management processing techniques to measure the strength of the interference from higher-layer data streams, but may be unable to employ such linear interference management processing techniques to measure the strength of the interference arising from lower-layer data streams based on the adoption of non-linear interference cancelation at the base station 105 for such lower-layer data streams.

In some implementations of the present disclosure, the base station 105 may configure multiple types of resources for transmitting reference signals precoded according to different settings of the forward filter to provide resources for both linear interference management processing and non-linear interference management processing at the UE 115. For example, the multiple types of resources may include a first type of resource over which the UE 115 may receive a first reference signal that is precoded according to a first setting of the forward filter associated with the UE 115 (for example, a setting of the forward filter associated with a layer corresponding to the UE 115) and a second type of resource over which the UE 115 may receive a second reference signal that is precoded according to a second setting of the forward filter associated with the UE 115 after interference cancelation and a third reference signal that is precoded according to a third setting of the forward filter associated with a lower-layer UE 115 (for example, a setting of the forward filter associated with a lower layer than the layer corresponding to the UE 115). The multiple types of resources may also include a third type of resource over which the UE 115 may receive a fourth reference signal that is precoded according to a fourth setting of the forward filter associated with a higher-layer UE 115 (for example, a setting of the forward filter associated with a higher layer than the layer corresponding to the UE 115).

In some examples, the UE 115 may measure a first signal strength (which may be associated with the channel gain between the base station 105 and the UE 115) based on receiving the first reference signal over the first type of resource and may measure a second signal strength based on receiving the second reference signal and the third reference signal over the second type of resource. In some implementations, the UE 115 may determine the interference arising at the UE 115 from the lower-layer UE 115 based on subtracting the first signal strength from the second signal strength. Additionally, in some examples, the UE 115 may determine a third signal strength based on receiving the fourth reference signal over the third reference signal and may determine the interference at the UE 115 arising from the higher-layer UE 115 based on the third signal strength. As such, the UE 115 may determine interference at the UE 115 arising from both lower-layer data streams and higher-layer data streams based on receiving reference signals precoded according to different settings of the forward filter over differently configured resource types. In some examples, the UE 115 may determine an SINR based on the interference measured at the UE 115, may determine a CQI based on the determined SINR, and may transmit the CQI to the base station 105 in a report, such as a CSI report. In some aspects, the base station 105 may determine an MCS based on the reported CQI and may transmit data to the UE 115 using the determined MCS.

Figure 2:
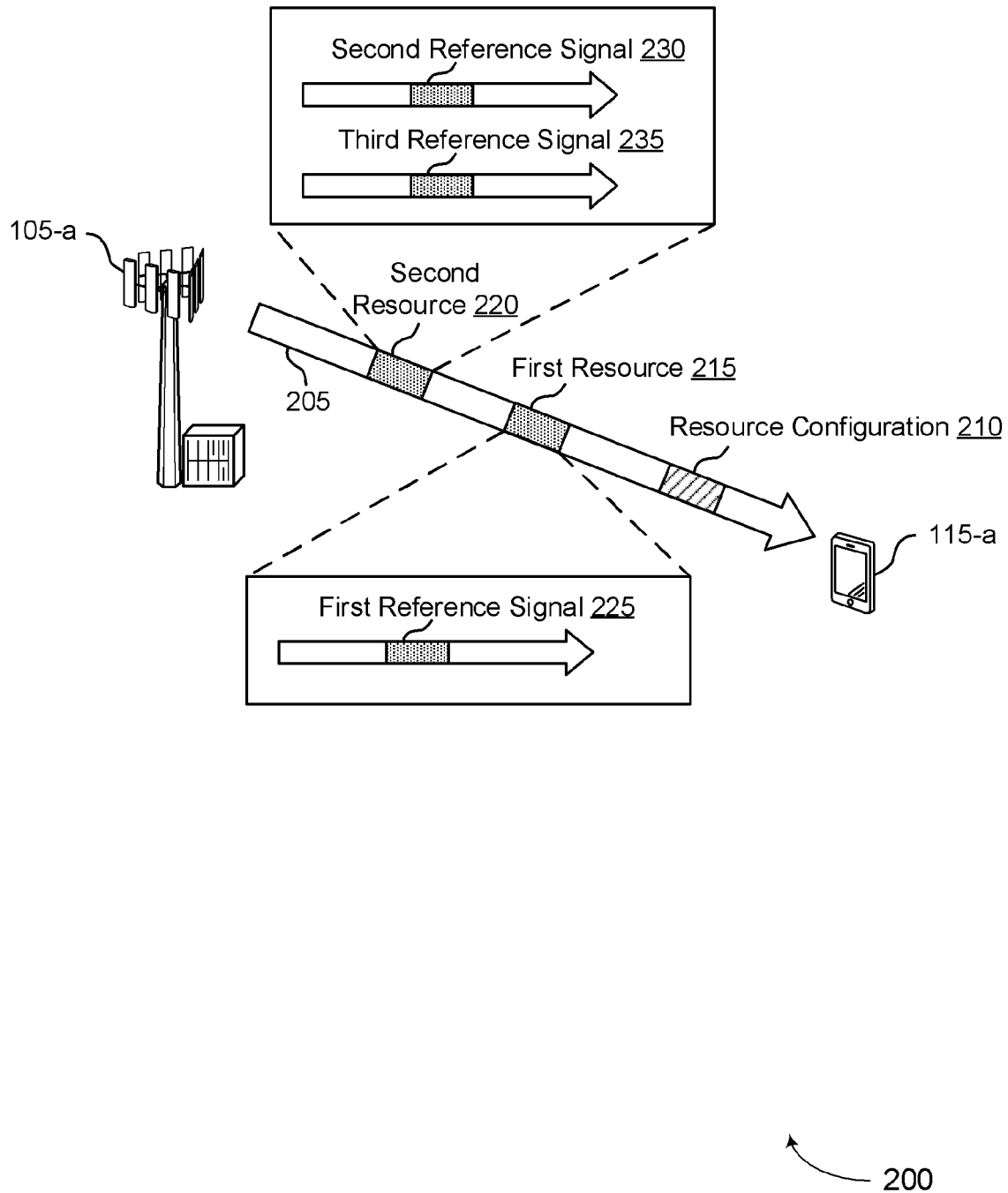

FIG. 2 illustrates an example of a wireless communications system 200 that supports inter-stream interference measurement for non-linear precoding techniques in accordance with aspects of the present disclosure. In some examples, the wireless communications system 200 may implement aspects of the wireless communications system 100. The wireless communications system 200 may include a base station 105-a and a UE 115-a that may communicate over a communication link 205, which may be examples of corresponding devices described herein. In some examples, the base station 105 may employ a non-linear precoding technique and may transmit reference signals to the UE 115 over multiple configured resource types and the UE 115 may measure interference arising from both lower-layer data streams (using non-linear interference management processing) and higher-layer data streams (using linear interference management processing) based on receiving the reference signals over the multiple configured resource types.

In some cases, the base station 105 may communicate with one or more UEs 115, such as the UE 115-a, over the same time and frequency resources. For example, the wireless communications system 200 may support downlink MU-MIMO transmissions and, as such, the base station 105-a may transmit downlink signaling, such as downlink data streams, to multiple UEs 115 over the same time and frequency resources. Such shared use of resources for multiple transmissions may improve system throughput and capacity while maintaining resource usage (thus improving spectral efficiency), but may result in increased levels of interference among the multiple transmissions. To mitigate the influence of such interference among the multiple transmissions that are sent over the same time and frequency resources, the base station 105-a may employ a linear precoding technique. For example, the base station 105-a may generate an orthogonal sequence for each of the multiple transmissions and transmit each of the multiple transmissions according to the corresponding orthogonal sequence. In some cases, however, the performance of a linear precoding technique may be limited in scenarios in which a quantity of dimensions associated with the sequences is less than a quantity of the multiple transmissions. For instance, the base station 105-a may transmit up to an upper limit of transmissions over the same time and frequency resources using a linear precoding technique, the upper limit defined according to the quantity of available orthogonal sequences (which may, in turn, be based on the quantity of dimensions associated with the sequences of the linear precoding technique). Accordingly, any transmissions in excess of the upper limit of transmissions may be delayed to a later transmission time, which may increase latency.

To avoid such limited performance, the base station 105-a may employ a non-linear precoding technique, according to which the base station 105-a may transmit multiple transmissions over the same time and frequency resources without an upper limit associated with the quantity of available orthogonal sequences (for example, without an upper limit associated with channel orthogonalization or separation for each of the multiple transmissions). For example, the base station 105-a may determine to employ non-linear precoding for spatial multiplexing schemes in some MU-MIMO applications. As such, the base station 105-a may achieve a greater throughput for each served UE 115 and for a cell associated with the base station 105-a. In some aspects, such a non-linear precoding technique may be a Thomlinson Harashima precoding (THP) technique.

In some aspects, a THP structure may function as a zero-forcing (ZF) THP. In such cases, the base station 105-a may calculate a forward filter F and a backward filter B based on an aggregated channel matrix H, which may be an aggregation of channel matrixes associated with each UE 115 served by the base station 105-a, including the UE 115-a. In some cases, the equivalent channel may be determined based on HF=S, such that S may be a lower-triangular matrix. As such, in examples in which the aggregated channel matrix H is accurate (such as in examples in which the CSI reported by the served UEs 115 is accurate or perfect in view of the actual channel conditions) at the base station 105-a, the base station 105-a may precode and transmit data streams such that the data streams will not interfere with any lower-layer data streams (such as data streams associated with smaller indexes). For instance, in examples in which the base station 105-a uses an accurate aggregated channel matrix H, the base station 105-a may transmit a data stream associated with an index m that will not interfere with data streams associated with indexes between 1 and m−1. Additional details relating to the use of a THP precoding technique are described herein, including with reference to FIG. 3.

In some cases, however, the aggregated channel matrix H at the base station 105-a may include or otherwise be associated with an error as compared to the true values (for example, as compared to the actual channel conditions of the UEs 115 served by the base station 105-a). Such channel matrix error may be referred to as imperfect CSI and may be the result of a channel estimation error, a channel time variance, or a processing granularity in the frequency domain. Further, because the base station 105-a uses the aggregated channel matrix H to generate the forward and backward filters in a non-linear precoding technique (such as a THP technique), such channel matrix error may propagate to the forward and backward filters, resulting in erroneous or otherwise sub-optimal precoding filters. Due to these errors, in some examples, the UE 115-a may receive a data stream from the base station 105-a that suffers from interference from both lower-layer data streams (for example, data streams associated with smaller indexes) and higher-layer data streams (for example, data streams associated with larger indexes). Further, the base station 105-a, employing the non-linear precoding technique (such as the THP technique) may use linear processing for interference cancelation for higher-layer streams and non-linear processing for interference cancelation for lower-layer streams, which may lead to an incompatibility at the UE-side for interference management.

For example, the UE 115-a may employ linear interference management processing to measure the interference at the UE 115-a arising from higher-layer data streams (which may include direct measurements of the interference strength at the UE 115-a if each higher-layer data stream of a number of higher-layer data streams is transmitted solely, such as over its own resource), but the UE 115-a may be unable to use the same linear interference management processing to measure the interference at the UE 115-a arising from lower-layer data streams because of the adoption and use of non-linear interference cancelation for lower-layer streams. As such, the UE 115-a may be unable to accurately measure the actual interference at the UE 115-a, which may result in erroneous or otherwise sub-optimal channel characteristic determinations (such as SINR or CQI determinations) by the UE 115-a that may, in turn, result in sub-optimal coding (such as a sub-optimal MCS) of downlink transmissions to the UE 115-a.

In some implementations of the present disclosure, the base station 105-a may configure different types of resources (such as CSI-RS resources) to enable the UE 115-a to measure both interference arising from higher-layer data streams and interference arising from lower-layer data streams, and may configure the UE 115-a to report the interference arising from lower-layer data streams so that the base station 105-a may determine a more optimal or suitable transport format for data streams to the UE 115-a, such as a more optimal or suitable physical downlink shared channel (PDSCH) MCS. For example, the base station 105-a may configure the UE 115-a with a first resource 215 and a second resource 220 that may be used for measuring interference at the UE 115-a arising from lower-layer data streams that are transmitted to another, lower-layer UE 115. In some implementations, the base station 105-a may indicate the configuration of the first resource 215 and the second resource 220 to the UE 115-a via a resource configuration 210. In some examples, the resource configuration 210 may be referred to as a CSI-RS resource configuration 210.

Figure 3:
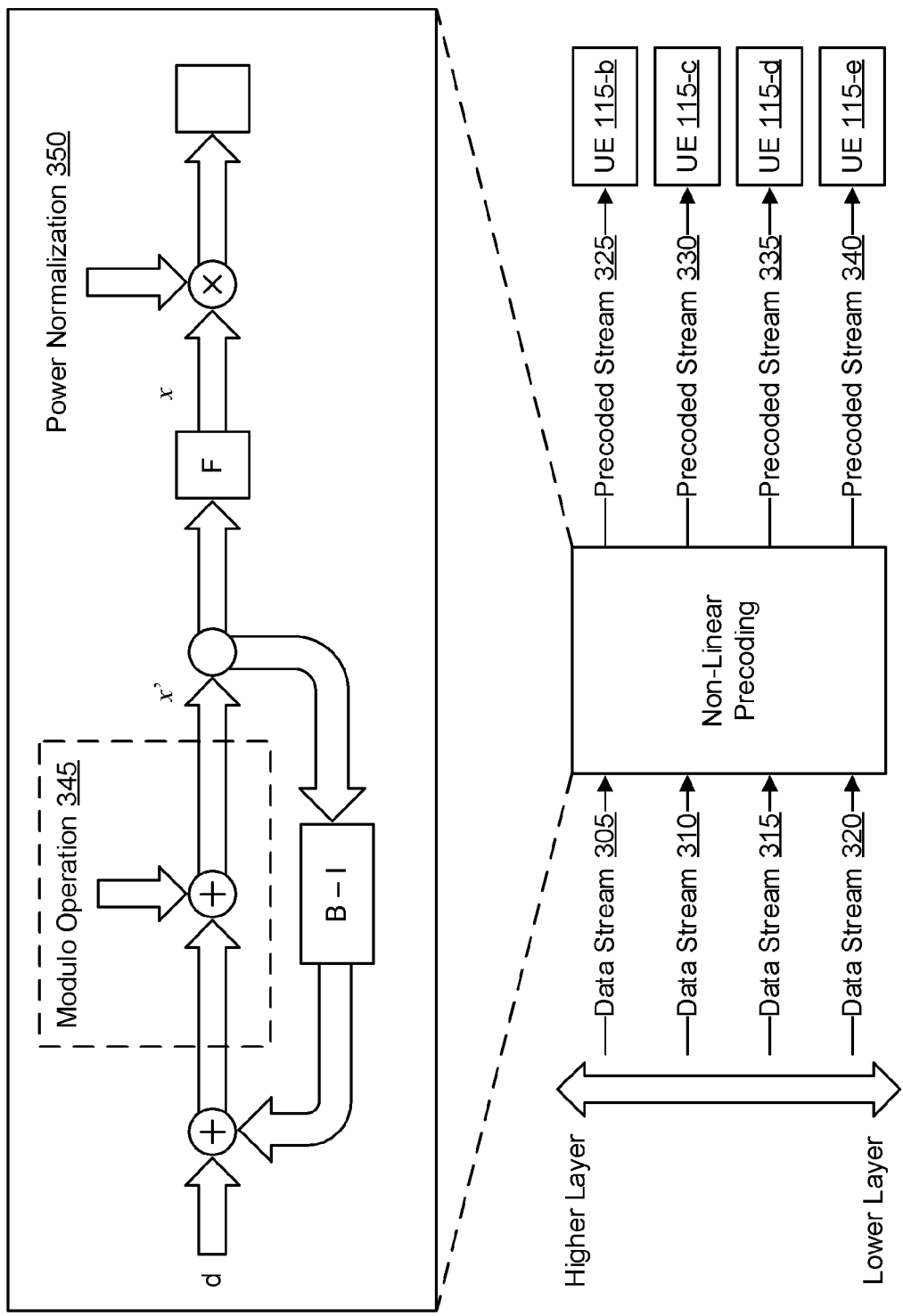
FIG. 3 illustrates an example of a non-linear precoding technique that supports inter-stream interference measurement for non-linear precoding techniques in accordance with aspects of the present disclosure.

In some aspects, the first resource 215 may be associated with a first type of resource over which the base station 105-a may transmit a first reference signal 225 that is precoded based on a first matrix of the forward filter F, the first matrix of the forward filter F corresponding to the UE 115-a (the forward filter F may include a number of matrixes, each matrix corresponding to one UE 115 of the UEs 115 served by the base station 105-a, as described in more detail with reference to FIG. 3). In other words, the first type of resource may be configured at the UE 115-a for measuring a channel gain of a desired signal and, as such, the first reference signal 225 transmitted over the first resource 215 may be an example of a non-zero power (NZP) reference signal. Further, in some examples, the first reference signal 225 may be a CSI-RS and, as such, may be referred to as an NZP CSI-RS. In such examples, the first resource 215 over which the base station 105-a may transmit the first reference signal 225 may be equivalently referred to as an NZP CSI-RS resource. In some aspects, the use of the first matrix of the forward filter F corresponding to the UE 115-a may be referred to as a first setting of a precoding filter.

The second resource 220 may be associated with a second type of resource over which the base station 105-a may transmit a second reference signal 230 and a third reference signal 235. In some examples, the second reference signal 230 may include pre-cancelation of the interference arising from a lower-layer. For example, to generate the second reference signal 230, the base station 105-a may subtract the interference arising from the lower-layer (such as from a lower-layer data stream) with a modulo operation. In some implementations, the base station 105-a may precode the second reference signal 230 (including the pre-cancelation of the interference from the lower-layer) based on the first matrix of the forward filter F corresponding to the UE 115-a and may precode the third reference signal 235 based on a second matrix of the forward filter F, the second matrix of the forward filter F corresponding to the lower layer than the layer associated with the UE 115-a. In some aspects, the inclusion of the pre-cancelation and the use of the first matrix of the forward filter F corresponding to the UE 115-a may be referred to as a second setting of the precoding filter and the use of the second matrix of the forward filter F corresponding to the lower-layer may be referred to as a third setting of the precoding filter. In some examples, the lower-layer may be associated with a different UE 115 than the UE 115-a. Further, in some examples, the second reference signal 230 and the third reference signal 235 may be configured as NZP CSI-RSs for interference measurement. In such examples, the second resource 220 over which the base station 105-a may transmit the second reference signal 230 and the third reference signal 235 may be equivalently referred to as an NZP CSI-RS resource for interference measurement.

In some implementations, the resource configuration 210 may indicate that the first resource 215 (associated with the first type of resource, such as an NZP CSI-RS resource) and the second resource 220 (associated with the second type of resource, such as an NZP CSI-RS resource for interference measurement) may be paired for measuring the non-linear interference arising from the lower layer (for example, may be paired for non-linear interference measurement). Accordingly, the UE 115-a may determine an interference measurement associated with the interference at the UE 115-a arising from the lower layer based on the first reference signal 225, the second reference signal 230, and the third reference signal 235. For example, the UE 115-a may measure or otherwise determine a first signal strength of the first reference signal 225 and may measure or otherwise determine a second signal strength of a combination of the second reference signal 230 and the third reference signal 235. As such, the UE 115-a may determine the interference measurement based on subtracting the first signal strength (which may correspond to a desired signal strength) from the second signal strength. Additionally or alternatively, the UE 115-a may determine the interference measurement based on determining an estimation result on an auxiliary matrix based on the second signal strength and subtracting the estimation result from the second signal strength.

In some examples, the base station 105-a, via the resource configuration 210, may also configure a third resource as a third type of resource over which the base station 105-a may transmit a fourth reference signal precoded based on a third matrix of the forward filter F, the third matrix of the forward filter F corresponding to a higher layer than the layer associated with the UE 115-a. In such examples, the resource configuration 210 may indicate that the third resource is for linear interference measurement. Accordingly, in some implementations, the UE 115-a may directly measure or otherwise determine a third signal strength of the fourth reference signal as a measurement of interference at the UE 115-a arising from the higher layer (such as from a data stream associated with the higher layer).

Upon determining the interference at the UE 115-a (including interference arising from lower-layer data streams and interference arising from higher-layer data streams), the UE 115-a may calculate or otherwise determine an SINR of a desired signal (such as an SINR that may be associated with a high likelihood for successful reception and decoding at the UE 115-a). The UE 115-a may calculate or otherwise determine a CQI based on the SINR value and may transmit the CQI to the base station 105-a in a report, such as in a CSI report. In some examples, the UE 115-a may include the CQI in the CSI report based on the resource configuration 210. The base station 105-a may likewise receive the CQI from the UE 115-a in the CSI report and may calculate or otherwise determine an MCS based on the CQI. Accordingly, the base station 105-a may transmit a data signal to the UE 115-a associated with the second setting of the precoding filter (for example, a data signal including pre-cancelation from lower-layer data streams and that is precoded based on the first matrix of the forward filter F) using the determined MCS. In some examples, the base station 105-a may more optimally account for the interference at the UE 115-a arising from lower-layer data streams and higher-layer data streams based on using the MCS determined based on the CQI received in the CSI report, which may increase the likelihood for successful downlink communication between the base station 105-a and the UE 115-a.

Although described in the context of a single resource of the second resource type for non-linear interference measurement (the second resource 220) and a single resource of the third resource type for linear interference measurement (the third resource), the base station 105-a may configure any number of resources for either non-linear interference measurement or linear interference measurement without exceeding the scope of the present disclosure. In some examples, the quantity of resources configured at the UE 115-a for non-linear interference measurement may be based on a quantity of data streams associated with a lower layer than the UE 115-a and the quantity of resources configured at the UE 115-a for linear interference measurement may be based on a quantity of data streams associated with a higher layer than the UE 115-a, as described with reference to FIG. 3.

FIG. 3 illustrates an example of a non-linear precoding technique 300 that supports inter-stream interference measurement for non-linear precoding techniques in accordance with aspects of the present disclosure. In some examples, the non-linear precoding technique 300 may be implemented to realize aspects of the wireless communications system 100 and the wireless communications system 200. For example, a base station 105 may implement the non-linear precoding technique 300 to transmit multiple data streams to multiple UEs 115 over the same time and frequency resources. In some examples, the non-linear precoding technique 300 may illustrate a THP technique associated with a ZF structure that the base station may use to transmit multiple data streams to multiple UEs 115 over the same time and frequency resources.

For example, the base station 105 may determine a data stream 305 for transmission to a UE 115-b, may generate a precoded stream 325 based on employing the non-linear precoding technique 300, and may transmit the precoded stream 325 to the UE 115-b. Similarly, the base station 105 may determine a data stream 310 for transmission to a UE 115-c, a data stream 315 for transmission to a UE 115-d, and a data stream 320 for transmission to a UE 115-e and may generate a precoded stream 330, a precoded stream 335, and a precoded stream 340 based on employing the non-linear precoding technique 300. Accordingly, the base station 105 may transmit the precoded stream 330 to the UE 115-c, the precoded stream 335 to the UE 115-d, and the precoded stream 340 to the UE 115-e. In some aspects, each of the data streams may be associated with an index value that is, in turn, associated with the layer over which the base station 105 may transmit a corresponding precoded data stream. For example, the data stream 320 may be associated with a first index value, the data stream 315 may be associated with a second index value, the data stream 310 may be associated with a third index value, and the data stream 305 may be associated with a fourth index value. In some examples, the fourth index value may be larger than the third index value, the third index value may be larger than the second index value, and the second index value may be larger than the first index value. In such examples, the base station 105 may transmit the data stream 305 over a fourth and highest layer, the data stream 310 over a third and next highest layer, the data stream 315 over a second and next highest layer, and the data stream 320 over a first and lowest layer. In some examples, the base station 105 may precode the data streams based on which layer the data stream is associated with using a forward filter F and a backward filter B, which the base station 105 may generate based on an aggregated channel matrix H, a modulo operation 345 including the addition of a first term, which may be referred to as a modulo vector (such as $p=p_I+jp_Q$, where $p_I$ or $p_Q$ is a multiple of a modulation constellation size X), and a power normalization 350 including the multiplication of a second term (such as $$\frac{1}{\sqrt{P_{max}}}\Bigg).$$

For example, the base station 105 may obtain or otherwise determine a channel matrix for each if not all of the UE 115-b, the UE 115-c, the UE 115-d, and the UE 115-e and may generate an aggregated channel matrix H based on the obtained or determined channel matrixes for each if not all of the UEs 115 served by the base station 105. For example, the aggregated channel matrix H may be defined such that $H=[H_1; H_2; \ldots; H_K] \in \mathbb{C}^{M_r \times M_t}$, such that $H_K \in \mathbb{C}^{M_{r,0} \times M_t}$ is the channel matrix of a UE 115 k, $M_{r,0}$ is a number of the receive antennas of a UE 115, and $M_{r,0}K=M_r \leq M_t$. $H_K$ may also be defined such that $H_K \in \mathbb{C}^{N \times M_t}$, such that $NK=M_r \leq M_t$.

The base station 105 may perform QR decomposition to the Hermitian transposition of H, generating $H=SF^H$, such that $S \in \mathbb{C}^{M_r \times M_r}$ is a lower-triangular matrix and $F \in \mathbb{C}^{M_t \times M_t}$ is a unitary matrix, satisfying $F^HF=I$. In some aspects, the base station 105 may also determine $H=SF^H$ based on performing a block-triangularization, such that $S \in \mathbb{C}^{M_r \times M_r}$ is a block-triangular matrix. In some aspects, F can be decomposed as $F=[F_1, F_2, \ldots, F_k]$, such that $F_k$ is the forward filter corresponding to the UE 115 k. The base station 105 may additionally define a diagonal matrix $$G = \text{diag}\left(\frac{1}{S_{11}}, \frac{1}{S_{22}}, \ldots, \frac{1}{S_{MM}}\right)$$

to determine the backward filter B, such that $s_{mm}$ is the $m^{th}$ diagonal entry of S and M is the number of UEs 115 served by the base station 105 or the number of spatial streams (for example, M=4 in the example of FIG. 3). In some examples, the base station 105 determine the backward filter B=GS, such that B−I is a lower-triangular matrix with diagonal entries equal to zeros. As illustrated by FIG. 3, the non-linear precoding technique 300 may include an input d, a modulo operation 345 including the addition of the modulo vector $p=p_I+jp_Q$ to output a value x', a feedback processing loop including B−I, and a feedforward processing step including the forward filter F to output a value x to be multiplied in the power normalization 350 by $$\frac{1}{\sqrt{P_{max}}}.$$

In some aspects, such a non-linear processing technique 300 may be implemented to determine the forward filter F and backward filter B. Accordingly, the base station 105 may precode the data streams based on the determined forward filter F, the determined backward filter B, and the modulo vector p. The received signal y at each UE 115 may be defined according to Equation (1) below.

$$y=HF\tilde{x}+n=S\tilde{x}+n \quad (1)$$

In Equation (1), $\tilde{x} \triangleq B^{-1}(a+p)$, such that a and p may be values that are based on the data stream or the spatial layer. In some examples, the equivalent channel may be based on combining the forward matrix F and the aggregated channel matrix H, and may be defined by HF=S, such that S is the equivalent channel and a lower-triangular matrix. As such, in examples in which the aggregated channel matrix H is accurate (which may be referred to as perfect CSI) at the base station 105, data streams associated with larger indexes (and likewise associated with higher-layer data streams) will not interfere with data streams associated with smaller indexes (and likewise associated with lower-layer data streams). For instance, in examples in which the aggregated channel matrix H is accurate, the data stream 305 will not interfere with the data stream 310, the data stream 315, or the data stream 320 because of inter-stream pre-cancelation.

In some examples, however, the aggregated channel matrix H may include an error (the base station 105 may have imperfect CSI), and the aggregated channel matrix H in Equation (1) may be defined as $H=H_0+\Delta_H$, such that $\Delta_H$ is the channel estimation error and is defined as $\Delta_H=[\Delta_{H,1}; \Delta_{H,2}; \ldots; \Delta_{H,k}]$, such that $\Delta_{H,k}$ is equal to the channel estimation error for the UE 115 k. In such examples in which the aggregated channel matrix H includes an error, the signal y received at the UEs 115 may include an additional equivalent channel gain term and an interference strength term based on the erroneous aggregated channel matrix H. In some aspects, the interference strength may increase with the channel matrix error $\Delta_{H,k}$.

In some examples (such as examples in which the signal y is transmitted over a layer that is higher than at least one other layer and lower than at least one other layer), the interference strength term may include two types of interference. For example, the interference strength term may include a first type of interference arising from a lower-layer data stream and a second type of interference arising from a higher-layer data stream. The first type of interference arising from the lower-layer data stream may be caused by both non-ideal (erroneous) interference pre-cancelation and a non-ideal (erroneous) forward precoding matrix. Accordingly, the portion of the interference term associated with the first type of interference may be based on a matrix of the forward filter F corresponding to the UE 115, one or more matrixes of the forward filter F corresponding to lower-layer UEs 115, and a matrix of the backward filter B corresponding to the UE 115. The second type of interference arising from the higher-layer data stream may be caused by a non-ideal (erroneous) forward precoding matrix and may not be caused by erroneous interference pre-cancelation. Accordingly, the portion of the interference term associated with the second type of interference may be based on one or more matrixes of the forward filter F corresponding to higher-layer UEs 115.

In some implementations of the present disclosure, the base station 105 may configure two types of CSI-RS resources at a UE 115 to enable accurate measurement of the first type of interference at the UE 115 arising from lower-layer data streams, which may be associated with non-linear interference based on the erroneous interference pre-cancelation. As described with reference to FIG. 2, the base station 105 may configure a first type of resource over which the base station 105 may transmit a first reference signal and a second type of resource over which the base station may transmit a second reference signal and a third reference signal. In some examples, the base station 105 may configure the CSI-RS resources and precode the reference signals based on for which UE 115 the base station is configuring for interference measurement.

For example, if the base station 105 configures the two types of CSI-RS resources at the UE 115-d, the base station 105 may precode the first reference signal based on the matrix of the forward filter F corresponding to the data stream 315 (which may be referred to as a second matrix of the forward filter $F_2$ because the data stream 315 may be associated with the second layer in the example of FIG. 3). In such examples, the base station 105 may non-linearly precode the second reference signal (which may include some non-linear interference pre-cancelation) based on the second matrix of the forward filter $F_2$ as well. The base station 105 may additionally linearly precode the third reference signal based on a matrix of the forward filter F associated with a lower layer than the second layer associated with the data stream 315, such as a first matrix of the forward filter $F_1$ associated with the first layer.

In some examples, the base station 105 may similarly configure a first type of resource over which the base station 105 may transmit a first reference signal and a second type of resource over which the base station 105 may transmit a second reference signal and a third reference signal for each UE 115 served by the base station (such as for each if not all of the UE 115-b, the UE 115-c, the UE 115-d, and the UE 115-e). In examples in which the base station 105 serves four UEs 115, the base station may configure ten resources as either a first type of resource or a second type of resource for the four UEs 115. For example, the base station 105 may configure a first resource over which the base station 105 may transmit a reference signal that is linearly precoded based on the first matrix of the precoding filter $F_1$ (such that the first resource may be configured as a first type of resource for the UE 115-e), a second resource over which the base station 105 may transmit a reference signal that is linearly precoded based on the second matrix of the precoding filter $F_2$ (such that the second resource may be configured as a first type of resource for the UE 115-d), a third resource over which the base station 105 may transmit a reference signal that is linearly precoded based on a third matrix of the precoding filter $F_3$ (such that the third resource may be configured as a first type of resource for the UE 115-c), and a fourth resource over which the base station 105 may transmit a reference signal that is linearly precoded based on a fourth matrix of the precoding filter $F_4$ (such that the fourth resource may be configured as a first type of resource for the UE 115-b).

Additionally, the base station may configure a fifth resource over which the base station 105 may transmit a reference signal that is linearly precoded based on the first matrix of the precoding filter $F_1$ and a reference signal that is non-linearly precoded based on the second matrix of the precoding filter $F_2$ and the backward filter B (such that the fifth resource may be configured as a second type of resource for the UE 115-d), a sixth resource over which the base station 105 may transmit a reference signal that is linearly precoded based on the first matrix of the precoding filter $F_1$ and a reference signal that is non-linearly precoded based on the third matrix of the precoding filter $F_3$ and the backward filter B (such that the sixth resource may be configured as a second type of resource for the UE 115-c), and a seventh resource over which the base station 105 may transmit a reference signal that is linearly precoded based on the first matrix of the precoding filter $F_1$ and a reference signal that is non-linearly precoded based on the fourth matrix of the precoding filter $F_4$ and the backward filter B (such that the seventh resource may be configured as a second type of resource for the UE 115-b).

Additionally, the base station 105 may configure an eighth resource over which the base station 105 may transmit a reference signal that is linearly precoded based on the second matrix of the precoding filter $F_2$ and a reference signal that is non-linearly precoded based on the third matrix of the precoding filter $F_3$ and the backward filter B (such that the eighth resource may be configured as a second type of resource for the UE 115-c), a ninth resource over which the base station 105 may transmit a reference signal that is linearly precoded based on the second matrix of the precoding filter $F_2$ and a reference signal that is non-linearly precoded based on the fourth matrix of the precoding filter $F_4$ and the backward filter B (such that the ninth resource may be configured as a second type of resource for the UE 115-b), and a tenth resource over which the base station 105 may transmit a reference signal that is linearly precoded based on the third matrix of the precoding filter $F_3$ and a reference signal that is non-linearly precoded based on the fourth matrix of the precoding filter $F_4$ and the backward filter B (such that the tenth resource may be configured as a second type of resource for the UE 115-b).

In addition to being configured as first types of resources for each of the UEs 115, respectively, the first resource, the second resource, the third resource, and the fourth resource may be configured as third types of resources for lower-layer UEs 115 over which the lower-layer UEs 115 may measure linear interference (because higher-layer data streams may cause linear interference at lower-layer UEs 115). As such, the second resource, the third resource, and the fourth resource may be configured as third types of resources for linear interference measurement at the UE 115-e, the third resource and the fourth resource may be configured as third types of resources for linear interference measurement at the UE 115-d, and the fourth resource may be configured as a third type of resource for linear interference measurement at the UE 115-c. Table 1 below shows which resources may be configured for which type of interference measurement at each UE 115 in table format, and the first resource corresponds to "Resource 1," the second resource corresponds to "Resource 2," and so on.

TABLE 1

| CSI Resource Configuration | Resource Configurations | | |
|---|---|---|---|
| | First Type | Second Type | Third Type |
| UE 115-e | Resource 1 | | Resources 2, 3, 4 |
| UE 115-d | Resource 2 | Resource 5 | Resources 3, 4 |
| UE 115-c | Resource 3 | Resources 6, 8 | Resource 4 |
| UE 115-b | Resource 4 | Resources 7, 9, 10 | |

As such, the base station 105 may transmit a CSI resource configuration to each if not all of the UE 115-b, the UE 115-c, the UE 115-d, and the UE 115-e, configuring one resource as a first type of resource (an NZP CSI-RS resource), zero, one, or multiple resources as a second type of resource for non-linear interference measurement from lower-layer data streams (a newly defined type of NZP CSI-RS resource for interference measurement), and zero, one, or multiple resources as a third type of resource for linear interference measurement from higher-layer data streams (an NZP CSI-RS resource for interference measurement). For example, for the UE 115-e, the base station 105 may configure the first resource as a first type of resource for channel gain measurement (the base station 105 may transmit a reference signal over the first resource that is precoded based on the matrix of the forward filter corresponding to the UE 115-e, such as $F_1$) and may configure each of the second resource, the third resource, and the fourth resource as a third type of resource for measuring interference arising from higher-layer data streams. For further example, for the UE 115-d, the base station 105 may configure the second resource as a first type of resource for channel gain measurement (the base station 105 may transmit a reference signal over the second resource that is precoded based on the matrix of the forward filter corresponding to the UE 115-d, such as $F_2$), may configure the fifth resource as a second type of resource for measuring interference arising from a lower-layer data stream, and may configure each of the third resource and the fourth resource as a third type of resource for measuring interference arising from higher-layer data streams.

In some implementations, each of the UEs 115 configured with a second type of resource may determine an interference measurement according to non-linear interference management processing techniques based on determining a first signal strength associated with the reference signal received over the first type of resource and determining a second signal strength associated with a combination of the reference signals received over the second type of resource. For example, the UE 115-d may determine a first signal strength associated with a first reference signal received over the second resource and a second signal strength associated with a combination of a second reference signal and a third reference signal received over the fifth resource. In some aspects, the first signal strength may be defined or referred to as $y_2$ and the second signal strength may be defined or referred to as $y_5$.

In such examples, the UE 115-$d$ may determine the non-linear interference measurement arising from the UE 115-$e$ (a lower-layer UE 115 associated with the first layer) based on subtracting $y_2$ from $y_5$. For example, the UE 115-$d$ may determine $y_{2,5}=y_5-y_2$, such that $y_{2,5}$ includes the interference term caused by the data stream 320 transmitted to the UE 115-$e$ on the data stream 315 transmitted to the UE 115-$d$, the modulo term associated with the modulo operation 345, and the noise term. In some examples, the base station 105 may remove the impact of the modulo term by setting $p_2=0$. For example, the base station 105 may refrain from performing the modulo operation 345. In some other examples, the UE 115-$d$ may remove the impact of the modulo vector by calculating or otherwise determining a minimum mean square error (MMSE) or a ZF-based equalizer on $y_5$ based on the channel matrix derived from $y_2$, which may result in the value of $a_2+p_2$, and estimating $p_2$ based on its lattice characteristics. In other words, $p_2$ may be a multiple of a modulation constellation size X. For example, the UE 115-$d$ may estimate or determine $p_2$ based on a modulo operator to determine the lesser (for example, the smaller of) of $a_2+p_2$ and the modulation constellation size X.

In some examples, the data stream 320 transmitted to the UE 115-$e$ may be associated with multiple ports and, in such examples, the base station 105 may transmit multiple symbols of the third reference signal over the multiple ports of the fifth resource, each symbol of the multiple symbols corresponding to one port of the multiple ports. For instance, in examples in which the data stream 320 is associated with two streams, the fifth resource may be associated with two ports and the base station 105 may transmit the second reference signal at one port at one time.

Additionally or alternatively, the UE 115-$d$ may average or filter $y_{2,5}$ in the coherent time period of the channel. In some implementations, the base station 105 may configure, via the CSI resource configuration, each of the UEs 115 to report CSI (including at least a CQI) based on the interference measurements performed by the UEs 115 over the configured resources. In such implementations, each if not all of the UEs 115 may each determine an SINR based on the determined interference measurements (which may include one or both of non-linear interference arising from lower-layer data streams or linear interference arising from higher-layer data streams) and may each determine a CQI based on the determined SINR. In some examples, each if not all of the UEs 115 may transmit a CSI report including the determined CQI to the base station 105. As such, the base station 105 may determine an MCS for each if not all of the UEs 115 based on the received CQI values and may transmit data signals to each if not all of the UEs 115 using the determined MCSs.

For example, the UE 115-$d$ may transmit a CQI to the base station 105 based on the interference measurement at the UE 115-$d$ and, in response, the base station 105 may transmit the precoded stream 335 to the UE 115-$d$ (which may be precoded based on the second matrix of the forward filter $F_2$ and include interference pre-cancelation associated with the backward filter B) using an MCS determined based on the CQI received from the UE 115-$d$. As such, the precoded stream 335 may experience less influence from both higher-layer data streams and lower-layer data streams, which may increase the likelihood for successful decoding of the precoded stream 335 at the UE 115-$d$.

Figure 4:
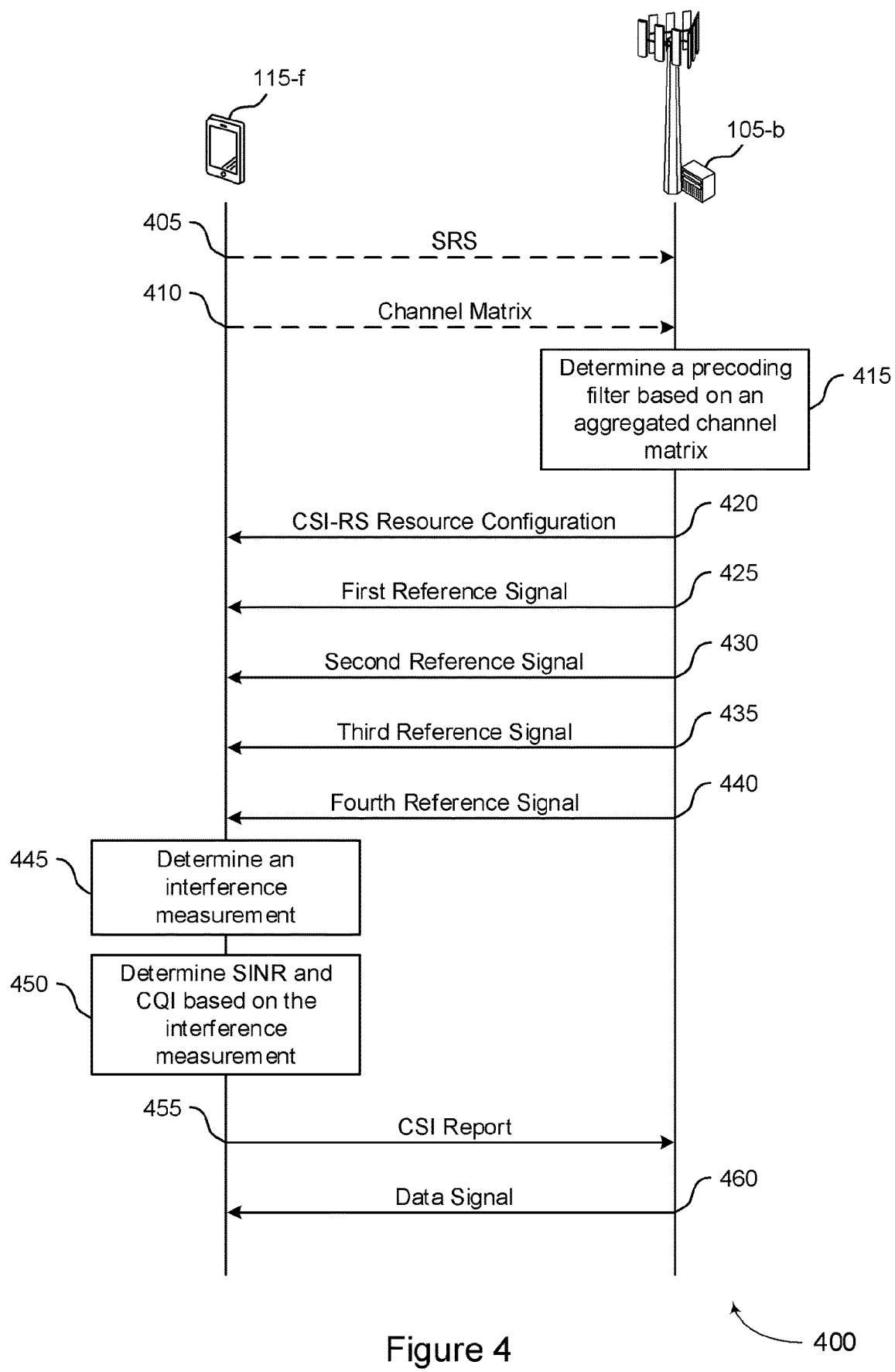
FIG. 4 illustrates an example of a process flow that supports inter-stream interference measurement for non-linear precoding techniques in accordance with aspects of the present disclosure.

FIG. 4 illustrates an example of a process flow 400 that supports inter-stream interference measurement for non-linear precoding techniques in accordance with aspects of the present disclosure. In some examples, the process flow 400 may implement aspects of the wireless communications system 100 and the wireless communications system 200. The process flow 400 illustrates communication between a base station 105-$b$ and a UE 115-$f$, which may be examples of corresponding devices described herein. In some examples, the base station 105-$b$ may configure multiple types of resources at the UE 115-$f$ and the UE 115-$f$ may receive one or more reference signals over each of the multiple types of resources to determine a non-linear interference measurement associated with interference arising from lower-layer streams and to determine a linear interference measurement associated with interference arising from higher-layer data streams. Alternative examples of the process flow may be implemented, in which some features are performed in a different order than described or are not performed at all. In some examples, operations may include additional features not mentioned below, or further operations may be added.

At 405, the UE 115-$f$ may, in some implementations, transmit a sounding reference signal (SRS) to the base station 105-$b$. In some examples, the base station 105-$b$ may determine a channel matrix associated with the UE 115-$f$ based on receiving the SRS and may use the channel matrix associated with the UE 115-$f$ to generate an aggregated channel matrix H.

At 410, the UE 115-$f$ may, in some implementations, transmit an explicit indication of the channel matrix associated with the UE 115-$f$ to the base station 105-$b$. In some examples, the UE 115-$f$ may transmit the explicit indication of the channel matrix associated with the UE 115-$f$ instead of transmitting the SRS to the base station 105-$b$ at 405. In such examples, the base station 105-$b$ may use the explicitly indicated channel matrix associated with the UE 115-$f$ to generate the aggregated channel matrix H.

At 415, the base station 105-$b$ may determine a precoding filter (such as a forward filter F or a backward filter B, or both) based on the aggregated channel matrix H. In examples in which the precoding filter is a backward filter B, a setting of the precoding filter may include an interference cancelation (or an interference pre-cancelation) and a modulo operation based on the backward filter B. The interference cancelation may include a subtracting of the interference associated with a lower-layer data stream from the layer associated with the UE 115-$f$. In some examples, the modulo operation may include adding an auxiliary matrix, and a value of an element of the auxiliary matrix is based on a multiplication of a modulation constellation size of a first reference signal and an integer. Additionally, the modulo operation includes determining an absolute value of a second reference signal, the absolute value of the second reference signal being less than or equal to the modulation constellation size of the first reference signal. In examples in which the precoding filter is a forward filter F, the precoding filter may include a subset of a precoding matrix associated with the forward filter. In some examples, the precoding filter may include a quantity of settings (or matrixes), each setting of the quantity of settings corresponding to a respective layer. Additional details relating to the forward filter F and the backward filter B are described herein, including with reference to FIG. 3.

At 420, the base station 105 may transmit a CSI-RS resource configuration to the UE 115-$f$ including an indication of a first resource and a second resource for non-linear interference management processing at the UE 115-*f*. In some examples, the first resource may be configured as a first type of resource for channel gain measurement and the second resource may be configured as a second type of resource for non-linear interference measurement. In such examples, the CSI-RS resource configuration may indicate that the first resource and the second resource are paired for the non-linear interference management processing. Additionally, in some examples, the CSI-RS resource configuration may include an indication of a fourth resource for linear interference management processing at the UE 115-*f*.

At 425, the base station 105-*b* may transmit a first reference signal to the UE 115-*f* over the first resource. In some examples, the first reference signal may be associated with a first setting of the precoding filter, the first setting associated with a layer corresponding to the UE 115-*f*. For example, the first setting of the precoding filter may refer to a matrix of the forward filter F corresponding to the UE 115-*f*, as described with reference to FIG. 3. In some aspects, the first reference signal may be an NZP CSI-RS.

At 430, the base station 105-*b* may transmit a second reference signal to the UE 115-*f* over the second resource. In some examples, the second reference signal may be associated with a second setting of the precoding filter, the second setting associated with the layer corresponding to the UE 115-*f*. For example, the second setting of the precoding filter may refer to the inclusion of an interference pre-cancelation and the use of the matrix of the forward filter F corresponding to the UE 115-*f*, as described with reference to FIG. 3. In some aspects, the second reference signal may be an NZP CSI-RS for interference measurement.

At 435, the base station 105-*b* may transmit a third reference signal to the UE 115-*f* over the second resource. In some examples, the third reference signal may be associated with a third setting of the precoding filter, the third setting associated with a lower layer than the layer corresponding to the UE 115-*f*. For example, the third setting of the precoding filter may refer to a matrix of the forward filter F corresponding to a second UE 115 associated with a lower layer than the UE 115-*f*, as described with reference to FIG. 3. In some aspects, the third reference signal may be an NZP CSI-RS for interference measurement.

At 440, the base station 105-*b* may transmit a fourth reference signal to the UE 115-*f* over the third resource. In some examples, the fourth reference signal may be associated with a fourth setting of the precoding filter, the fourth setting associated with a higher layer than the layer corresponding to the UE 115-*f*. For example, the fourth setting of the precoding filter may refer to a matrix of the forward filter F corresponding to a third UE 115 associated with a higher layer than the UE 115-*f*, as described with reference to FIG. 3. In some aspects, the fourth reference signal may be an NZP CSI-RS for interference measurement.

At 445, the UE 115-*f* may determine a non-linear interference measurement based on the first reference signal, the second reference signal, and the third reference signal and may determine a linear interference measurement based on the fourth reference signal. In some examples, the UE 115-*f* may determine the non-linear interference measurement based on determining a first signal strength associated with the first reference signal and a second signal strength associated with a combination of the second reference signal and the third reference signal, and subtracting the first signal strength from the second signal strength. Additionally or alternatively, the UE 115-*f* may determine the non-linear interference measurement based on determining an estimation result on an auxiliary matrix based on the second signal strength and subtracting the estimation result from the second signal strength. In some examples, the UE 115-*f* may determine the linear interference measurement based on directly measuring a signal strength associated with the fourth reference signal.

At 450, the UE 115-*f* may determine an SINR based on the interference measurement (one or both of the non-linear interference measurement and the linear interference measurement) and may determine a CQI based on the SINR.

At 455, the UE 115-*f* may transmit a CSI report to the base station 105-*b* including the CQI based on the CSI resource configuration. For example, the CSI resource configuration may include an indication for the UE 115-*f* to include the determined CQI in the CSI report.

At 460, the base station 105-*b* may transmit a data signal to the UE 115-*f*. In some examples, the data signal may be associated with the second setting of the precoding filter and an MCS determined by the base station 105-*b* based on the CQI received in the CSI report at 455.

Figure 5:
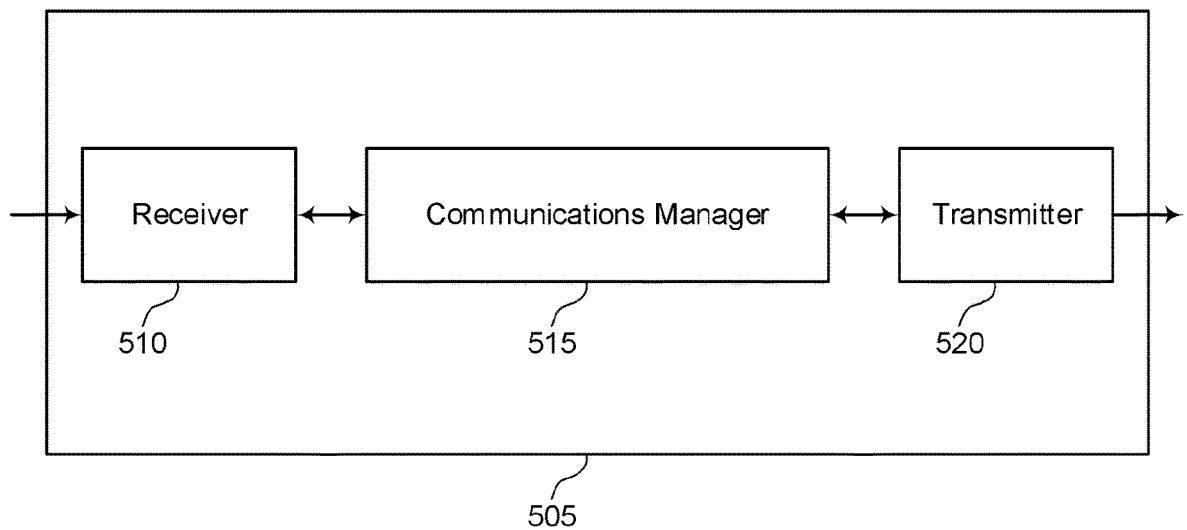
FIGS. 5 and 6 show block diagrams of devices that support inter-stream interference measurement for non-linear precoding techniques in accordance with aspects of the present disclosure.

FIG. 5 shows a block diagram of a device 505 that supports inter-stream interference measurement for non-linear precoding techniques in accordance with aspects of the present disclosure. The device 505 may be an example of aspects of a UE 115. The device 505 may include a receiver 510, a communications manager 515, and a transmitter 520. The communications manager 515 can be implemented, at least in part, by one or moth of a modem and a processor. Each of these components may be in communication with one another (for example, via one or more buses).

The receiver 510 may receive information such as packets, user data, or control information associated with various information channels (for example, control channels, data channels, and information related to inter-stream interference measurement for non-linear precoding techniques). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, a CSI resource configuration including an indication of a first resource and a second resource for non-linear interference management processing, receive, from the base station over the first resource, a first reference signal associated with a first setting of a precoding filter and, from the base station over the second resource, a second reference signal associated with a second setting of the precoding filter and a third reference signal associated with a third setting of the precoding filter, the first setting of the precoding filter and the second setting of the precoding filter corresponding to a first layer associated with the first UE and the third setting of the precoding filter corresponding to a second layer associated with a second UE, the second layer being a lower layer than the first layer, determine, based on interference arising from the second layer associated with the second UE, an interference measurement at the first UE based on the first reference signal, the second reference signal, and the third reference signal, and communicate with the base station based on the interference measurement.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and the transmitter 520 may be implemented as analog components (for example, amplifiers, filters, antennas) coupled to the mobile device modem to enable wireless transmission and reception over one or more bands.

The communications manager 515 may be implemented to realize one or more potential advantages. In some implementations, the communications manager 515 may measure non-linear interference at the device 505 arising from lower-layer data streams and linear interference at the device 505 arising from higher-layer data streams. In some examples, the communications manager 515 may determine and report, to a serving base station, a CQI based on the inter-stream interference measurement, which the base station may use to determine a more suitable or a more optimal MCS to use for downlink transmissions to the device 505. As such, the communications manager 515 may receive downlink transmissions with an MCS that is adapted to interference arising from both linear and non-linear processing, which may increase the likelihood for successful reception and decoding of the downlink transmissions by the communications manager 515. Accordingly, the communications manager 515 may more frequently enter a sleep mode or stay in a sleep mode for longer durations, or both, which may improve power savings at the device 505 and increase the battery life of the device 505.

Figure 6:
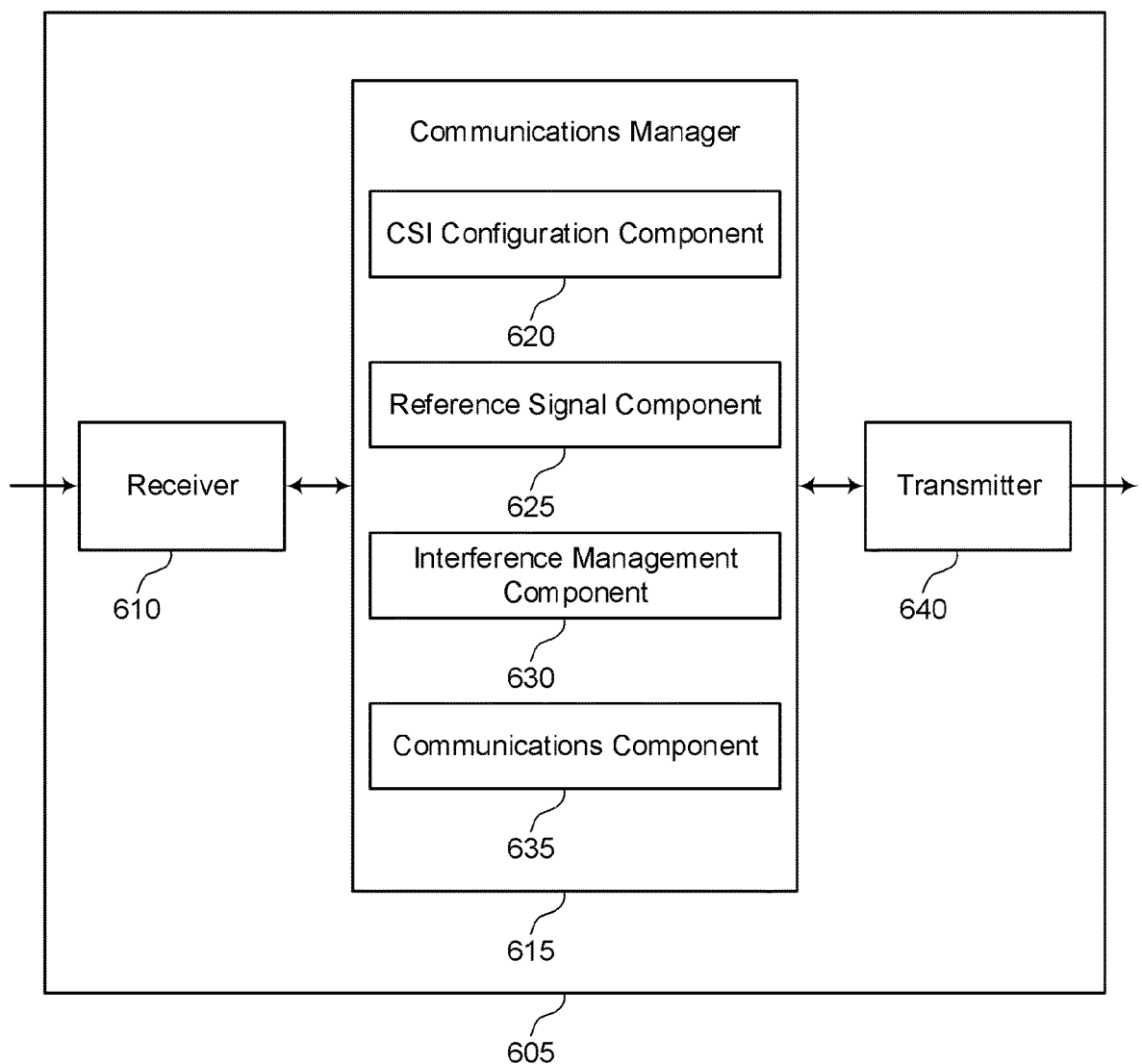

FIG. 6 shows a block diagram of a device 605 that supports inter-stream interference measurement for non-linear precoding techniques in accordance with aspects of the present disclosure. The device 605 may be an example of aspects of a device 505, or a UE 115. The device 605 may include a receiver 610, a communications manager 615, and a transmitter 640. The communications manager 615 can be implemented, at least in part, by one or moth of a modem and a processor. Each of these components may be in communication with one another (for example, via one or more buses).

The receiver 610 may receive information such as packets, user data, or control information associated with various information channels (for example, control channels, data channels, and information related to inter-stream interference measurement for non-linear precoding techniques). Information may be passed on to other components of the device 605. The receiver 610 may be an example of aspects of the transceiver 820 described with reference to FIG. 8. The receiver 610 may utilize a single antenna or a set of antennas.

The communications manager 615 may include a CSI configuration component 620, a reference signal component 625, an interference management component 630, and a communications component 635.

The CSI configuration component 620 may receive, from a base station, a CSI resource configuration including an indication of a first resource and a second resource for non-linear interference management processing. The reference signal component 625 may receive, from the base station over the first resource, a first reference signal associated with a first setting of a precoding filter and, from the base station over the second resource, a second reference signal associated with a second setting of the precoding filter and a third reference signal associated with a third setting of the precoding filter, the first setting of the precoding filter and the second setting of the precoding filter corresponding to a first layer associated with the first UE and the third setting of the precoding filter corresponding to a second layer associated with a second UE, the second layer being a lower layer than the first layer.

The interference management component 630 may determine, based on interference arising from the second layer associated with the second UE, an interference measurement at the first UE based on the first reference signal, the second reference signal, and the third reference signal. The communications component 635 may communicate with the base station based on the interference measurement.

The transmitter 640 may transmit signals generated by other components of the device 605. In some examples, the transmitter 640 may be collocated with a receiver 610 in a transceiver component. For example, the transmitter 640 may be an example of aspects of the transceiver 820 described with reference to FIG. 8. The transmitter 640 may utilize a single antenna or a set of antennas.

Figure 7:
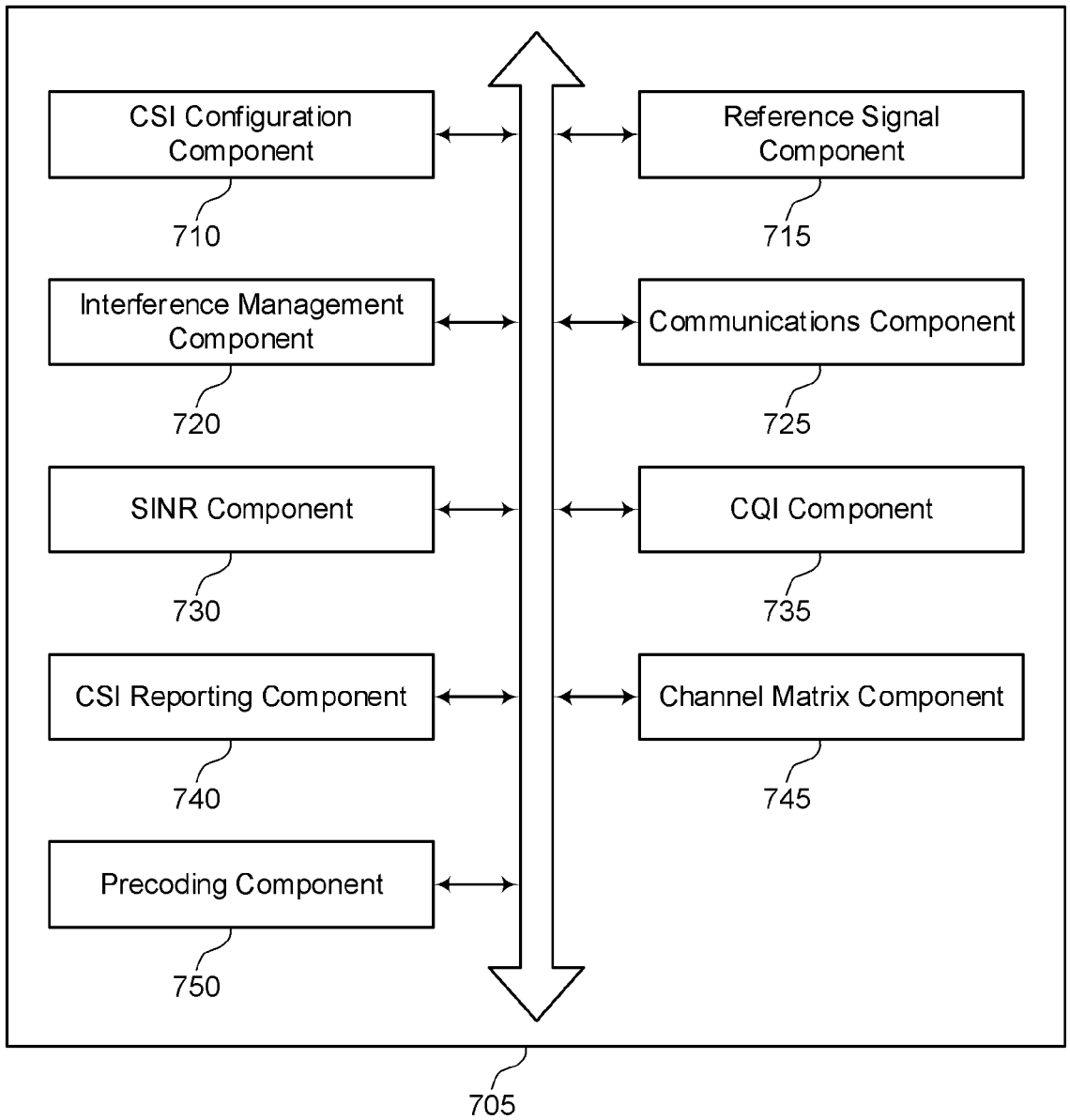
FIG. 7 shows a block diagram of a communications manager that supports inter-stream interference measurement for non-linear precoding techniques in accordance with aspects of the present disclosure.

FIG. 7 shows a block diagram of a communications manager 705 that supports inter-stream interference measurement for non-linear precoding techniques in accordance with aspects of the present disclosure. The communications manager 705 may be an example of aspects of a communications manager 515, a communications manager 615, or a communications manager 810 described herein. The communications manager 705 may include a CSI configuration component 710, a reference signal component 715, an interference management component 720, a communications component 725, a SINR component 730, a CQI component 735, a CSI reporting component 740, a channel matrix component 745, and a precoding component 750. Each of these components may communicate, directly or indirectly, with one another (for example, via one or more buses).

The CSI configuration component 710 may receive, from a base station, a CSI resource configuration including an indication of a first resource and a second resource for non-linear interference management processing.

The reference signal component 715 may receive, from the base station over the first resource, a first reference signal associated with a first setting of a precoding filter and, from the base station over the second resource, a second reference signal associated with a second setting of the precoding filter and a third reference signal associated with a third setting of the precoding filter, the first setting of the precoding filter and the second setting of the precoding filter corresponding to a first layer associated with the first UE and the third setting of the precoding filter corresponding to a second layer associated with a second UE, the second layer being a lower layer than the first layer.

In some examples, the reference signal component 715 may receive a set of symbols of the third reference signal over a set of ports of the second resource, each symbol of the set of symbols corresponding to one port of the set of ports. In some examples, the reference signal component 715 may receive, from the base station over the third resource, a fourth reference signal associated with a fourth setting of the precoding filter, the fourth setting of the precoding filter corresponding to a third layer associated with a third UE, the third layer being a higher layer than the first layer.

In some examples, the first reference signal is an NZP CSI-RS. In some examples, the second reference signal and the third reference signal are NZP CSI-RSs for interference measurement. In some examples, the second reference signal and the third reference signal are associated with a non-linear precoding.

The interference management component 720 may determine, based on interference arising from the second layer associated with the second UE, an interference measurement at the first UE based on the first reference signal, the second reference signal, and the third reference signal. In some examples, the interference management component 720 may determine a first signal strength associated with the first reference signal based on receiving the first reference signal over the first resource.

In some examples, the interference management component 720 may determine a second signal strength associated with a combination of the second reference signal and the third reference signal based on receiving the second reference signal and the third reference signal over the second resource, determining the interference measurement being based on the first signal strength and the second signal strength. In some examples, the interference management component 720 may subtract the first signal strength from the second signal strength.

In some examples, the interference management component 720 may determine an estimation result on an auxiliary matrix based on determining the second signal strength. In some examples, the interference management component 720 may subtract the estimation result from the second signal strength. In some examples, the interference management component 720 may determine, based on interference arising from the third layer associated with the third UE, a second interference measurement at the first UE based on the fourth reference signal. In some examples, communicating with the base station is based on the second interference measurement.

The communications component 725 may communicate with the base station based on the interference measurement. In some examples, the communications component 725 may receive, from the base station, a data signal associated with the second setting of the precoding filter and an MCS, the MCS based on the CQI.

The SINR component 730 may determine a SINR based on the interference measurement. The CQI component 735 may determine a CQI based on the SINR. In some examples, communicating with the base station is based on the CQI.

The CSI reporting component 740 may transmit, to the base station, a CSI report including the CQI based on the CSI resource configuration. The channel matrix component 745 may transmit, to the base station, a sounding reference signal for determining a channel matrix associated with the first UE or an indication of the channel matrix associated with the first UE, the precoding filter being based on the channel matrix associated with the first UE.

The precoding component 750 may subtract an interference associated with the third setting of the precoding filter from the first setting of the precoding filter based on the backward filter. In some examples, the precoding component 750 may add an auxiliary matrix, a value of an element of the auxiliary matrix being based on a multiplication of a modulation constellation size of the first reference signal and an integer.

In some examples, the precoding component 750 may determine an absolute value of the second reference signal, the absolute value of the second reference signal being less than or equal to the modulation constellation size of the first reference signal. In some examples, the precoding filter includes a backward filter associated with a non-linear precoding technique. In some examples, the second setting of the precoding filter includes an interference cancelation and a modulo operation based on the backward filter.

In some examples, the precoding filter includes a forward filter associated with a non-linear precoding technique. In some examples, a setting of the precoding filter includes a subset of a precoding matrix associated with the forward filter. In some examples, the precoding filter includes a quantity of settings, each setting of the quantity of settings corresponding to a respective layer.

Figure 8:
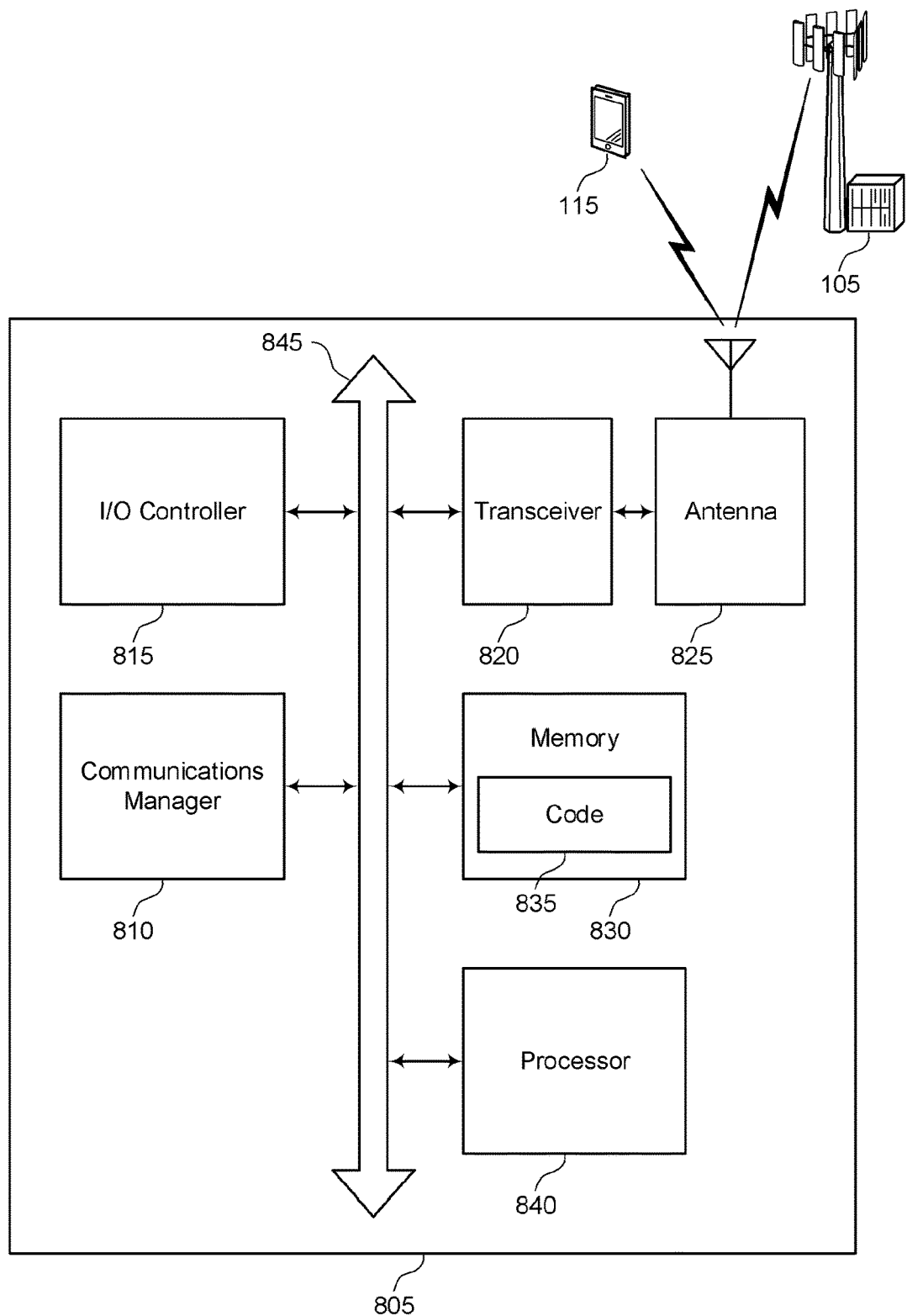
FIG. 8 shows a diagram of a system including a device that supports inter-stream interference measurement for non-linear precoding techniques in accordance with aspects of the present disclosure.

FIG. 8 shows a diagram of a system including a device 805 that supports inter-stream interference measurement for non-linear precoding techniques in accordance with aspects of the present disclosure. The device 805 may be an example of or include the components of device 505, device 605, or a UE 115. The device 805 may include components for bi-directional voice and data communications including components for transmitting and receiving communications, including a communications manager 810, an input/output (I/O) controller 815, a transceiver 820, an antenna 825, memory 830, and a processor 840. These components may be in electronic communication via one or more buses (for example, bus 845).

The communications manager 810 may receive, from a base station, a CSI resource configuration including an indication of a first resource and a second resource for non-linear interference management processing, receive, from the base station over the first resource, a first reference signal associated with a first setting of a precoding filter and, from the base station over the second resource, a second reference signal associated with a second setting of the precoding filter and a third reference signal associated with a third setting of the precoding filter, the first setting of the precoding filter and the second setting of the precoding filter corresponding to a first layer associated with the first UE and the third setting of the precoding filter corresponding to a second layer associated with a second UE, the second layer being a lower layer than the first layer, determine, based on interference arising from the second layer associated with the second UE, an interference measurement at the first UE based on the first reference signal, the second reference signal, and the third reference signal, and communicate with the base station based on the interference measurement.

The I/O controller 815 may manage input and output signals for the device 805. The I/O controller 815 may also manage peripherals not integrated into the device 805. In some examples, the I/O controller 815 may represent a physical connection or port to an external peripheral. In some examples, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some examples, the I/O controller 815 may be implemented as part of a processor. In some examples, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some examples, the wireless device may include a single antenna 825. However, in some examples the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some examples, the memory 830 may contain, among other things, a basic I/O system (BIOS) which may control basic hardware or software operation such as the interaction with peripheral components or devices.

The processor 840 may include an intelligent hardware device, (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some examples, the processor 840 may be configured to operate a memory array using a memory controller. In other cases, a memory controller may be integrated into the processor 840. The processor 840 may be configured to execute computer-readable instructions stored in a memory (for example, the memory 830) to cause the device 805 to perform various functions (for example, functions or tasks supporting inter-stream interference measurement for non-linear precoding techniques).

The code 835 may include instructions to implement aspects of the present disclosure, including instructions to support wireless communications. The code 835 may be stored in a non-transitory computer-readable medium such as system memory or other type of memory. In some examples, the code 835 may not be directly executable by the processor 840 but may cause a computer (for example, when compiled and executed) to perform functions described herein.

Figure 9:
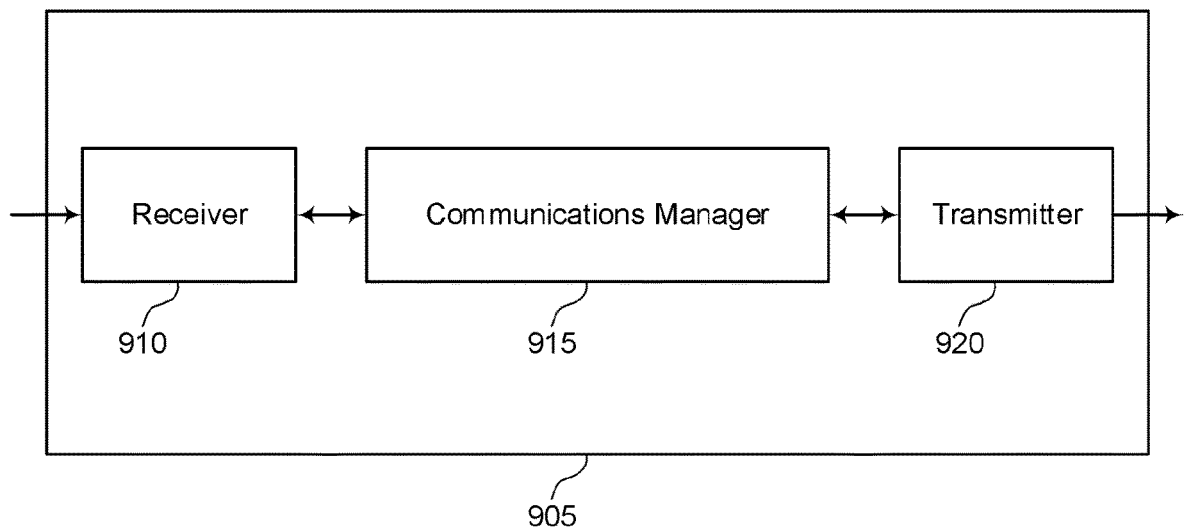
FIGS. 9 and 10 show block diagrams of devices that support inter-stream interference measurement for non-linear precoding techniques in accordance with aspects of the present disclosure.

FIG. 9 shows a block diagram of a device 905 that supports inter-stream interference measurement for non-linear precoding techniques in accordance with aspects of the present disclosure. The device 905 may be an example of aspects of a base station 105. The device 905 may include a receiver 910, a communications manager 915, and a transmitter 920. The communications manager 915 can be implemented, at least in part, by one or moth of a modem and a processor. Each of these components may be in communication with one another (for example, via one or more buses).

The receiver 910 may receive information such as packets, user data, or control information associated with various information channels (for example, control channels, data channels, and information related to inter-stream interference measurement for non-linear precoding techniques). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine a precoding filter of a non-linear precoding technique for precoding one or more data transmissions, a first setting of the precoding filter and a second setting of the precoding filter corresponding to a first layer associated with a first UE and a third setting of the precoding filter corresponding to a second layer associated with a second UE, the second layer being a lower layer than the first layer, transmit, to the first UE, a CSI resource configuration including an indication of a first resource and a second resource for non-linear interference management processing at the first UE, transmit, to the first UE over the first resource, a first reference signal associated with the first setting of the precoding filter and, to the first UE over the second resource, a second reference signal associated with the second setting of the precoding filter and a third reference signal associated with the third setting of the precoding filter, and receive, from the first UE, a CSI report including a CQI, the CQI based on an interference measurement by the UE, the interference measurement being based on the first reference signal, the second reference signal, and the third reference signal.

The transmitter 920 may transmit signals generated by other components of the device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a single antenna or a set of antennas.

The communications manager 915 may be implemented to realize one or more potential advantages. In some implementations, the communications manager 915 may configure multiple types of resources at a UE to support non-linear interference measurement and linear interference measurement at the UE, which may enable the UE to provide a more accurate CQI to the communications manager 915. The communications manager 915, based on receiving the CQI from the UE that accounts for both non-linear and linear interference at the UE, which may arise from lower-layer data streams and higher-layer data streams, respectively, may determine a more optimal MCS to use for downlink transmissions to the UE, which may increase the likelihood for successful reception of the downlink transmissions at the UE. Accordingly, the communications manager 915 may achieve higher data rates, greater system throughput, and greater spectral efficiency.

Figure 10:
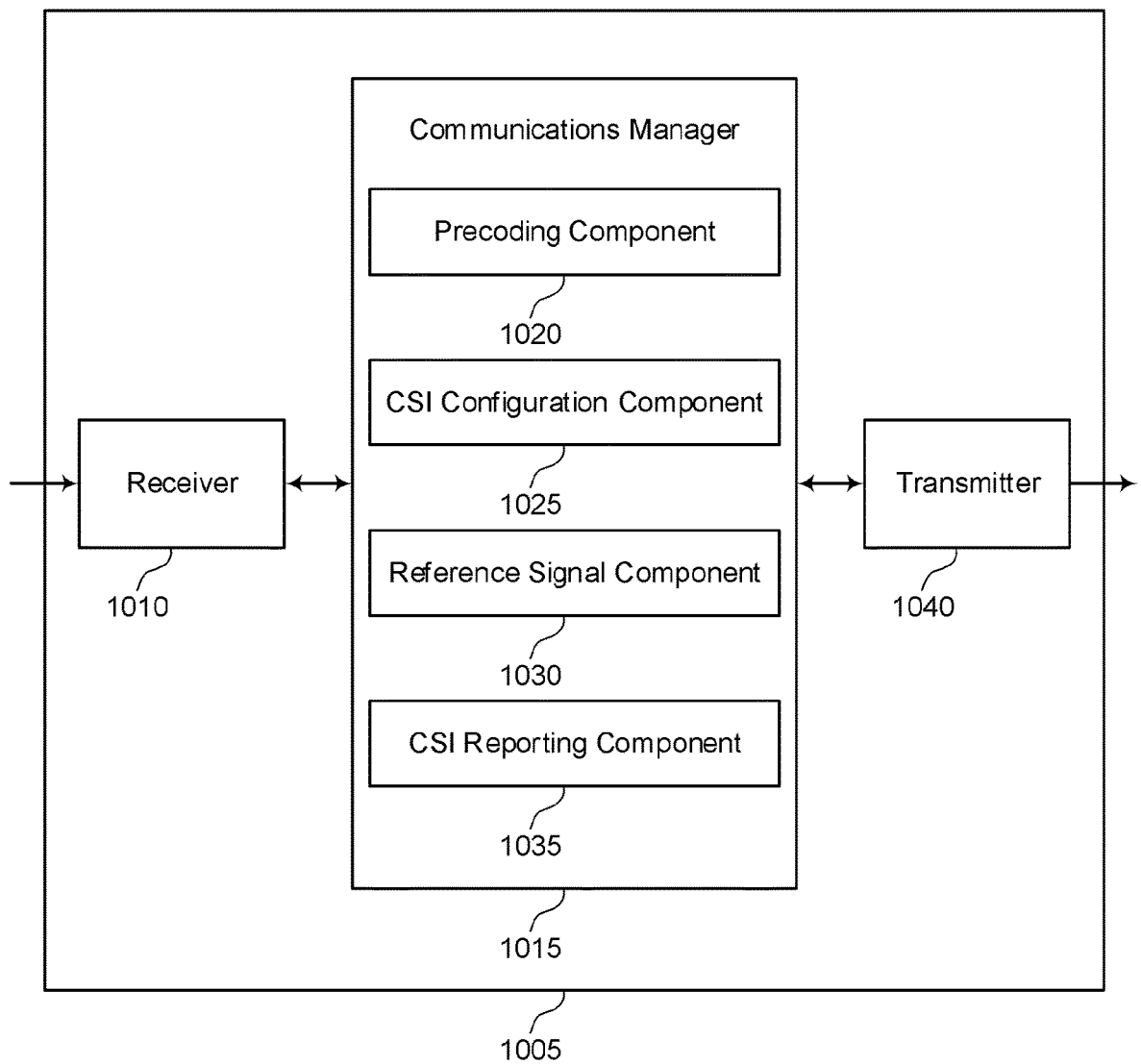

FIG. 10 shows a block diagram of a device 1005 that supports inter-stream interference measurement for non-linear precoding techniques in accordance with aspects of the present disclosure. The device 1005 may be an example of aspects of a device 905, or a base station 105. The device 1005 may include a receiver 1010, a communications manager 1015, and a transmitter 1040. The communications manager 10e15 can be implemented, at least in part, by one or moth of a modem and a processor. Each of these components may be in communication with one another (for example, via one or more buses).

The receiver 1010 may receive information such as packets, user data, or control information associated with various information channels (for example, control channels, data channels, and information related to inter-stream interference measurement for non-linear precoding techniques). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may include a precoding component 1020, a CSI configuration component 1025, a reference signal component 1030, and a CSI reporting component 1035.

The precoding component 1020 may determine a precoding filter of a non-linear precoding technique for precoding one or more data transmissions, a first setting of the precoding filter and a second setting of the precoding filter corresponding to a first layer associated with a first UE and a third setting of the precoding filter corresponding to a second layer associated with a second UE, the second layer being a lower layer than the first layer.

The CSI configuration component 1025 may transmit, to the first UE, a CSI resource configuration including an indication of a first resource and a second resource for non-linear interference management processing at the first UE. The reference signal component 1030 may transmit, to the first UE over the first resource, a first reference signal associated with the first setting of the precoding filter and, to the first UE over the second resource, a second reference signal associated with the second setting of the precoding filter and a third reference signal associated with the third setting of the precoding filter. The CSI reporting component 1035 may receive, from the first UE, a CSI report including a CQI, the CQI based on an interference measurement by the UE, the interference measurement being based on the first reference signal, the second reference signal, and the third reference signal.

The transmitter 1040 may transmit signals generated by other components of the device 1005. In some examples, the transmitter 1040 may be collocated with a receiver 1010 in a transceiver component. For example, the transmitter 1040 may be an example of aspects of the transceiver 1220 described with reference to FIG. 12. The transmitter 1040 may utilize a single antenna or a set of antennas.

Figure 11:
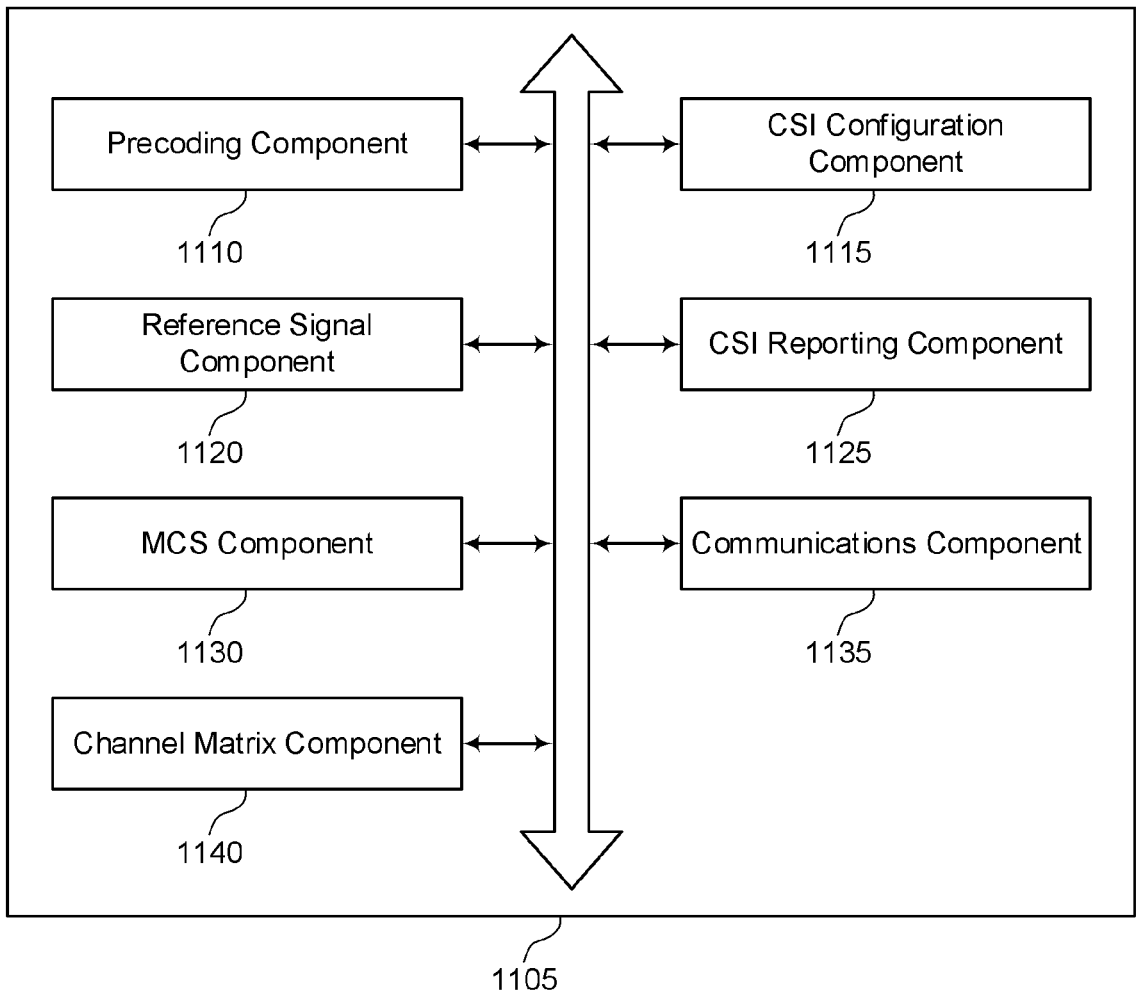
FIG. 11 shows a block diagram of a communications manager that supports inter-stream interference measurement for non-linear precoding techniques in accordance with aspects of the present disclosure.

FIG. 11 shows a block diagram of a communications manager 1105 that supports inter-stream interference measurement for non-linear precoding techniques in accordance with aspects of the present disclosure. The communications manager 1105 may be an example of aspects of a communications manager 915, a communications manager 1015, or a communications manager 1210 described herein. The communications manager 1105 may include a precoding component 1110, a CSI configuration component 1115, a reference signal component 1120, a CSI reporting component 1125, a MCS component 1130, a communications component 1135, and a channel matrix component 1140. Each of these components may communicate, directly or indirectly, with one another (for example, via one or more buses).

The precoding component 1110 may determine a precoding filter of a non-linear precoding technique for precoding one or more data transmissions, a first setting of the precoding filter and a second setting of the precoding filter corresponding to a first layer associated with a first UE and a third setting of the precoding filter corresponding to a second layer associated with a second UE, the second layer being a lower layer than the first layer.

In some examples, the precoding component 1110 may subtract an interference associated with the third setting of the precoding filter from the first setting of the precoding filter based on the backward filter. In some examples, the precoding component 1110 may add an auxiliary matrix, a value of an element of the auxiliary matrix being based on a multiplication of a modulation constellation size of the first reference signal and an integer.

In some examples, the precoding component 1110 may determine an absolute value of the second reference signal, the absolute value of the second reference signal being less than or equal to the modulation constellation size of the first reference signal.

In some examples, the precoding filter includes a backward filter associated with a non-linear precoding technique. In some examples, the second setting of the precoding filter includes an interference cancelation and a modulo operation based on the backward filter. In some examples, the precoding filter includes a forward filter associated with the non-linear precoding technique. In some examples, a setting of the precoding filter includes a subset of a precoding matrix associated with the forward filter. In some examples, the precoding filter includes a quantity of settings, each setting of the quantity of settings corresponding to a respective layer.

The CSI configuration component 1115 may transmit, to the first UE, a CSI resource configuration including an indication of a first resource and a second resource for non-linear interference management processing at the first UE.

The reference signal component 1120 may transmit, to the first UE over the first resource, a first reference signal associated with the first setting of the precoding filter and, to the first UE over the second resource, a second reference signal associated with the second setting of the precoding filter and a third reference signal associated with the third setting of the precoding filter. In some examples, the reference signal component 1120 may transmit a set of symbols of the third reference signal over a set of ports of the second resource, each symbol of the set of symbols corresponding to one port of the set of ports.

In some examples, the reference signal component 1120 may transmit, to the first UE over the third resource, a fourth reference signal associated with a fourth setting of the precoding filter, the fourth setting of the precoding filter corresponding to a third layer associated with a third UE, the third layer being a higher layer than the first layer. In some examples, the first reference signal is an NZP CSI-RS. In some examples, the second reference signal and the third reference signal are NZP CSI-RSs for interference measurement. In some examples, the second reference signal and the third reference signal are associated with a non-linear precoding.

The CSI reporting component 1125 may receive, from the first UE, a CSI report including a CQI, the CQI based on an interference measurement by the UE, the interference measurement being based on the first reference signal, the second reference signal, and the third reference signal. The MCS component 1130 may determine an MCS based on the CQI.

The communications component 1135 may transmit, to the first UE, a data signal using the second setting of the precoding filter and the MCS.

The channel matrix component 1140 may receive, from the first UE, a first sounding reference signal for determining a first channel matrix associated with the first UE or a first indication of the first channel matrix associated with the first UE and, from the second UE, a second sounding reference signal for determining a second channel matrix associated with the second UE or a second indication of the second channel matrix associated with the second UE. In some examples, the channel matrix component 1140 may determine the first channel matrix associated with the first UE and the second channel matrix associated with the second UE based on the receiving. In some examples, determining the precoding filter is based on the first channel matrix and the second channel matrix.

Figure 12:
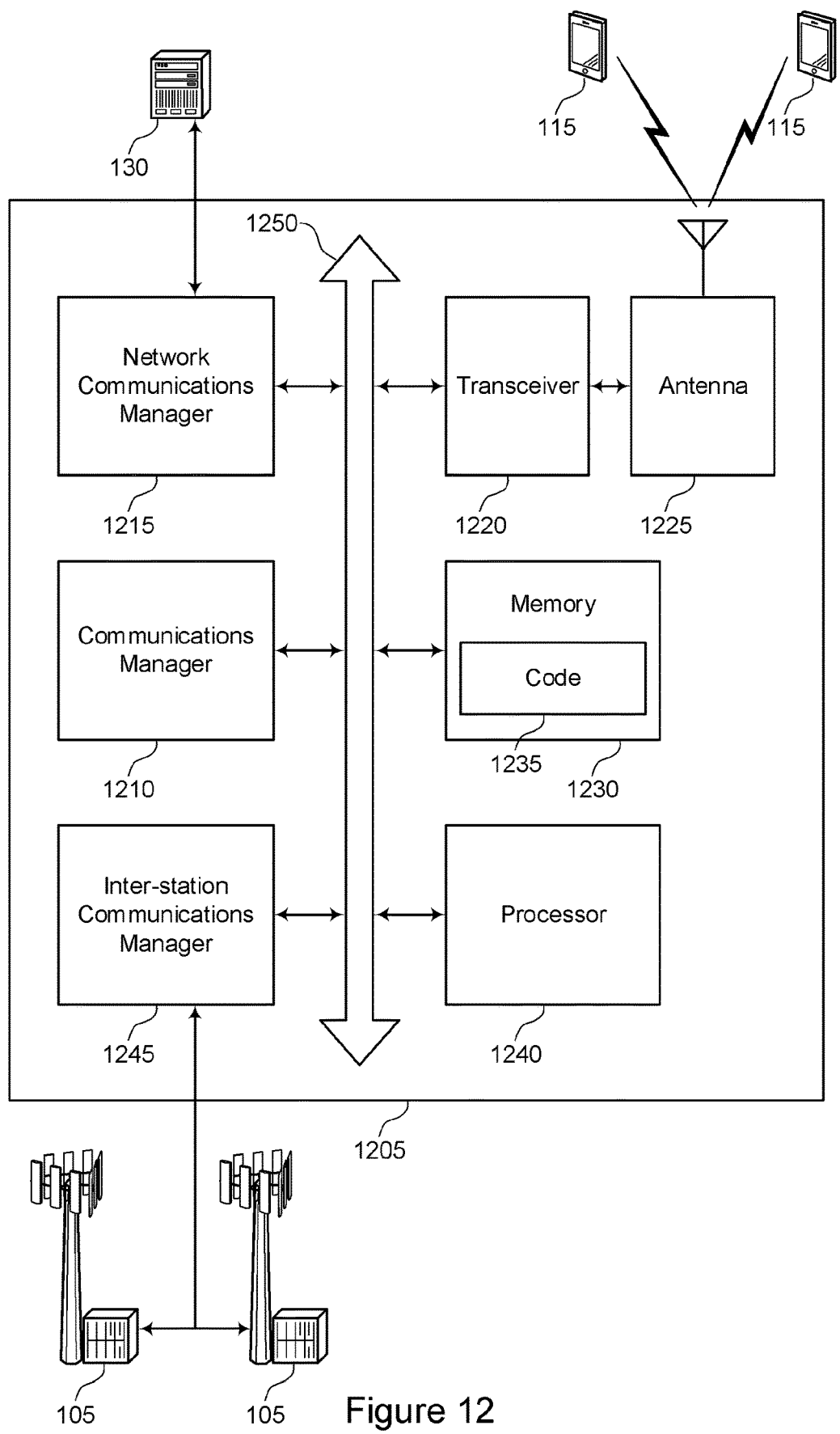
FIG. 12 shows a diagram of a system including a device that supports inter-stream interference measurement for non-linear precoding techniques in accordance with aspects of the present disclosure.

FIG. 12 shows a diagram of a system including a device 1205 that supports inter-stream interference measurement for non-linear precoding techniques in accordance with aspects of the present disclosure. The device 1205 may be an example of or include the components of device 905, device 1005, or a base station 105. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245.

These components may be in electronic communication via one or more buses (for example, bus 1250).

The communications manager 1210 may determine a precoding filter of a non-linear precoding technique for precoding one or more data transmissions, a first setting of the precoding filter and a second setting of the precoding filter corresponding to a first layer associated with a first UE and a third setting of the precoding filter corresponding to a second layer associated with a second UE, the second layer being a lower layer than the first layer, transmit, to the first UE, a CSI resource configuration including an indication of a first resource and a second resource for non-linear interference management processing at the first UE, transmit, to the first UE over the first resource, a first reference signal associated with the first setting of the precoding filter and, to the first UE over the second resource, a second reference signal associated with the second setting of the precoding filter and a third reference signal associated with the third setting of the precoding filter, and receive, from the first UE, a CSI report including a CQI, the CQI based on an interference measurement by the UE, the interference measurement being based on the first reference signal, the second reference signal, and the third reference signal.

The network communications manager 1215 may manage communications with the core network (for example, via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some examples, the wireless device may include a single antenna 1225. However, in some examples, the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (for example, the processor 1240) cause the device to perform various functions described herein. In some examples, the memory 1230 may contain, among other things, a BIOS which may control basic hardware or software operation such as the interaction with peripheral components or devices.

The processor 1240 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1240 may be configured to operate a memory array using a memory controller. In some examples, a memory controller may be integrated into processor 1240. The processor 1240 may be configured to execute computer-readable instructions stored in a memory (for example, the memory 1230) to cause the device 1205 to perform various functions (for example, functions or tasks supporting inter-stream interference measurement for non-linear precoding techniques).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some examples, the code 1235 may not be directly executable by the processor 1240 but may cause a computer (for example, when compiled and executed) to perform functions described herein.

Figure 13:
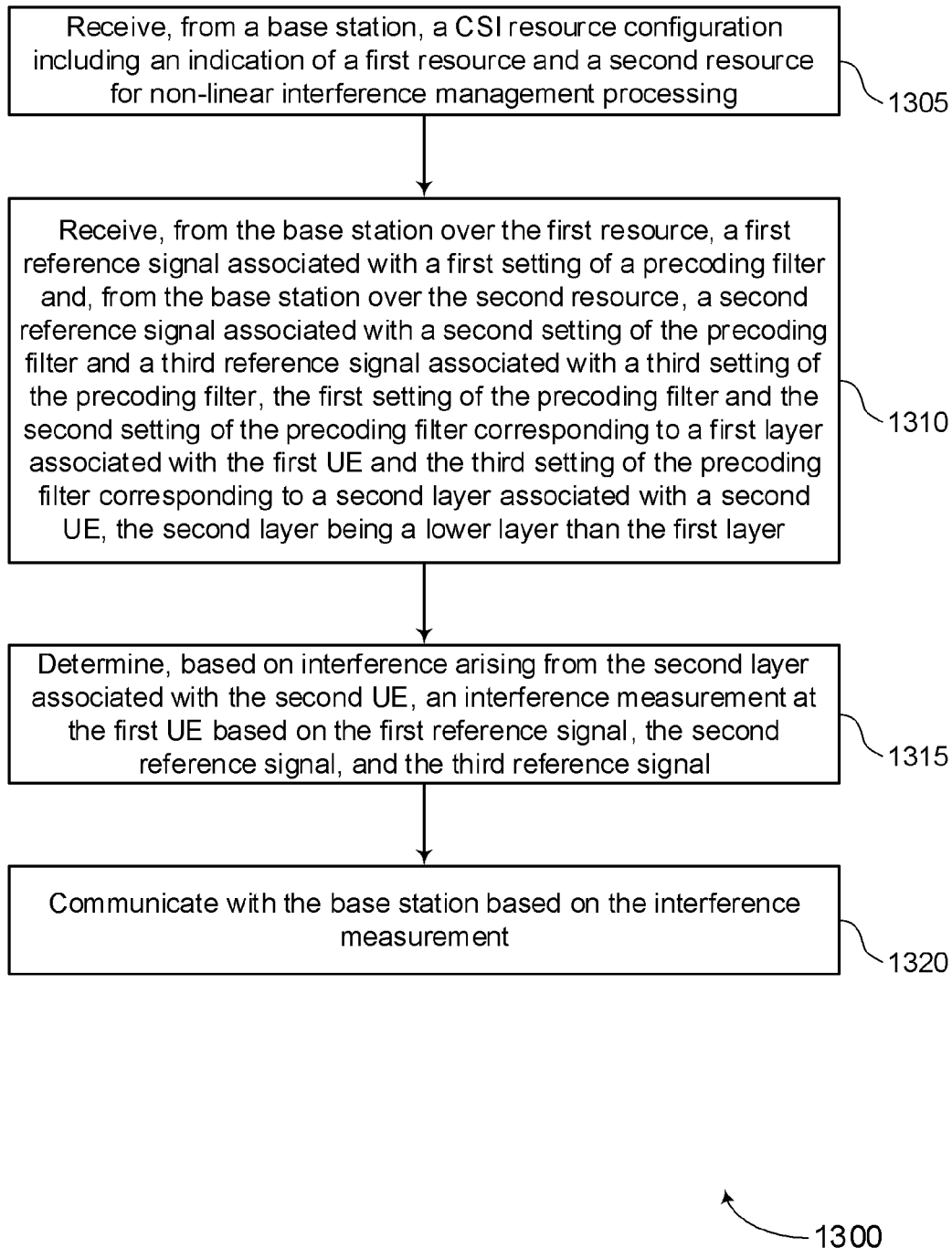
FIGS. 13-16 show flowcharts illustrating methods that support inter-stream interference measurement for non-linear precoding techniques in accordance with aspects of the present disclosure.

FIG. 13 shows a flowchart illustrating a method 1300 that supports inter-stream interference measurement for non-linear precoding techniques in accordance with aspects of the present disclosure. The operations of method 1300 may be implemented by a UE 115 or its components. For example, the operations of method 1300 may be performed by a communications manager as described with reference to FIGS. 5-8. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a base station, a CSI resource configuration including an indication of a first resource and a second resource for non-linear interference management processing. The operations of 1305 may be performed according to the methods described herein. In some examples, aspects of the operations of 1305 may be performed by a CSI configuration component as described with reference to FIGS. 5-8.

At 1310, the UE may receive, from the base station over the first resource, a first reference signal associated with a first setting of a precoding filter and, from the base station over the second resource, a second reference signal associated with a second setting of the precoding filter and a third reference signal associated with a third setting of the precoding filter, the first setting of the precoding filter and the second setting of the precoding filter corresponding to a first layer associated with the first UE and the third setting of the precoding filter corresponding to a second layer associated with a second UE, the second layer being a lower layer than the first layer. The operations of 1310 may be performed according to the methods described herein. In some examples, aspects of the operations of 1310 may be performed by a reference signal component as described with reference to FIGS. 5-8.

At 1315, the UE may determine, based on interference arising from the second layer associated with the second UE, an interference measurement at the first UE based on the first reference signal, the second reference signal, and the third reference signal. The operations of 1315 may be performed according to the methods described herein. In some examples, aspects of the operations of 1315 may be performed by an interference management component as described with reference to FIGS. 5-8.

At 1320, the UE may communicate with the base station based on the interference measurement. The operations of 1320 may be performed according to the methods described herein. In some examples, aspects of the operations of 1320 may be performed by a communications component as described with reference to FIGS. 5-8.

Figure 14:
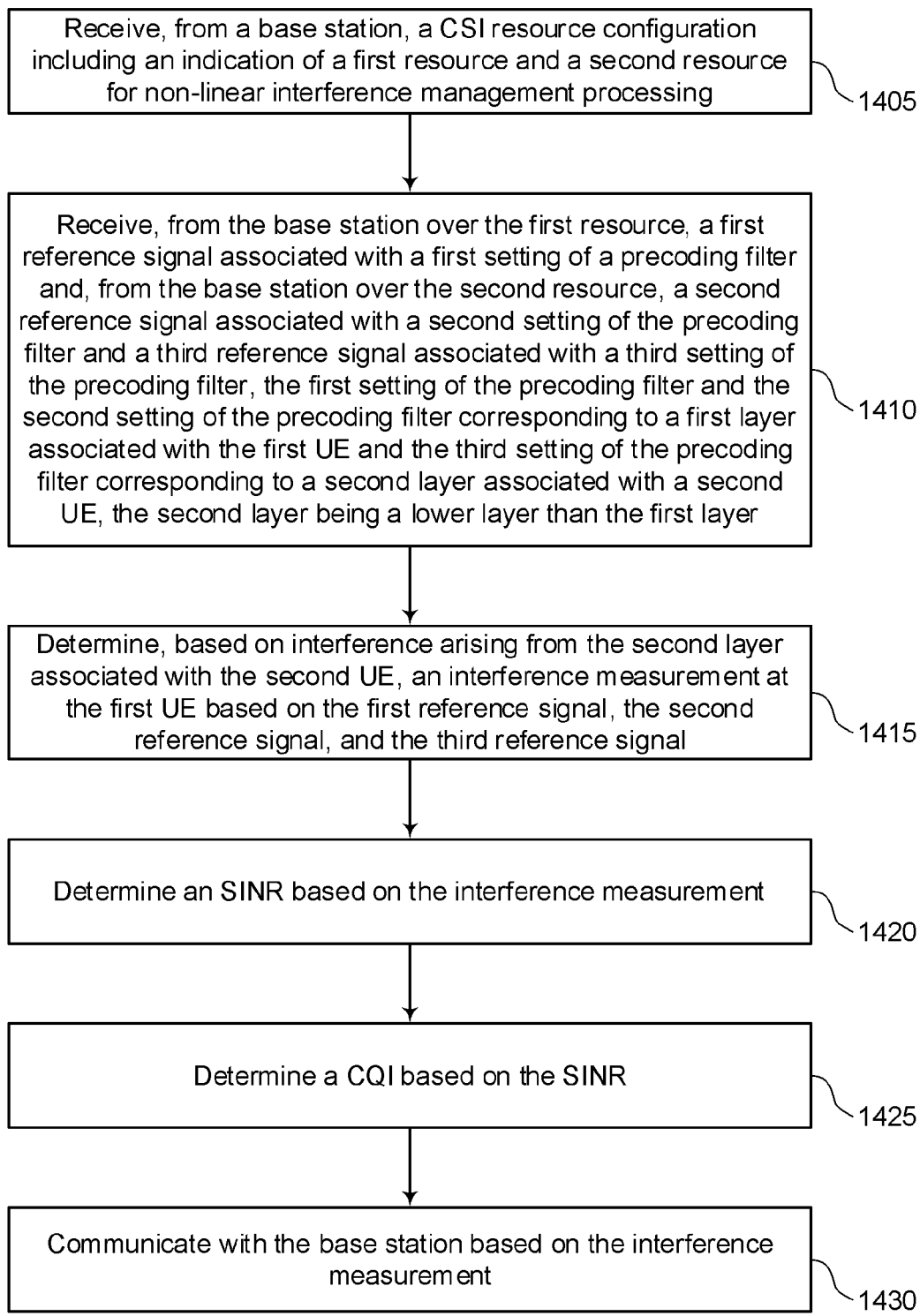

FIG. 14 shows a flowchart illustrating a method 1400 that supports inter-stream interference measurement for non-linear precoding techniques in accordance with aspects of the present disclosure. The operations of method 1400 may be implemented by a UE 115 or its components. For example, the operations of method 1400 may be performed by a communications manager as described with reference to FIGS. 5-8. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, a CSI resource configuration including an indication of a first resource and a second resource for non-linear interference management processing. The operations of 1405 may be performed according to the methods described herein. In some examples, aspects of the operations of 1405 may be performed by a CSI configuration component as described with reference to FIGS. 5-8.

At 1410, the UE may receive, from the base station over the first resource, a first reference signal associated with a first setting of a precoding filter and, from the base station over the second resource, a second reference signal associated with a second setting of the precoding filter and a third reference signal associated with a third setting of the precoding filter, the first setting of the precoding filter and the second setting of the precoding filter corresponding to a first layer associated with the first UE and the third setting of the precoding filter corresponding to a second layer associated with a second UE, the second layer being a lower layer than the first layer. The operations of 1410 may be performed according to the methods described herein. In some examples, aspects of the operations of 1410 may be performed by a reference signal component as described with reference to FIGS. 5-8.

At 1415, the UE may determine, based on interference arising from the second layer associated with the second UE, an interference measurement at the first UE based on the first reference signal, the second reference signal, and the third reference signal. The operations of 1415 may be performed according to the methods described herein. In some examples, aspects of the operations of 1415 may be performed by an interference management component as described with reference to FIGS. 5-8.

At 1420, the UE may determine a SINR based on the interference measurement. The operations of 1420 may be performed according to the methods described herein. In some examples, aspects of the operations of 1420 may be performed by a SINR component as described with reference to FIGS. 5-8.

At 1425, the UE may determine a CQI based on the SINR. In some examples, communicating with the base station is based on the CQI. The operations of 1425 may be performed according to the methods described herein. In some examples, aspects of the operations of 1425 may be performed by a CQI component as described with reference to FIGS. 5-8.

At 1430, the UE may communicate with the base station based on the interference measurement. The operations of 1430 may be performed according to the methods described herein. In some examples, aspects of the operations of 1430 may be performed by a communications component as described with reference to FIGS. 5-8.

Figure 15:
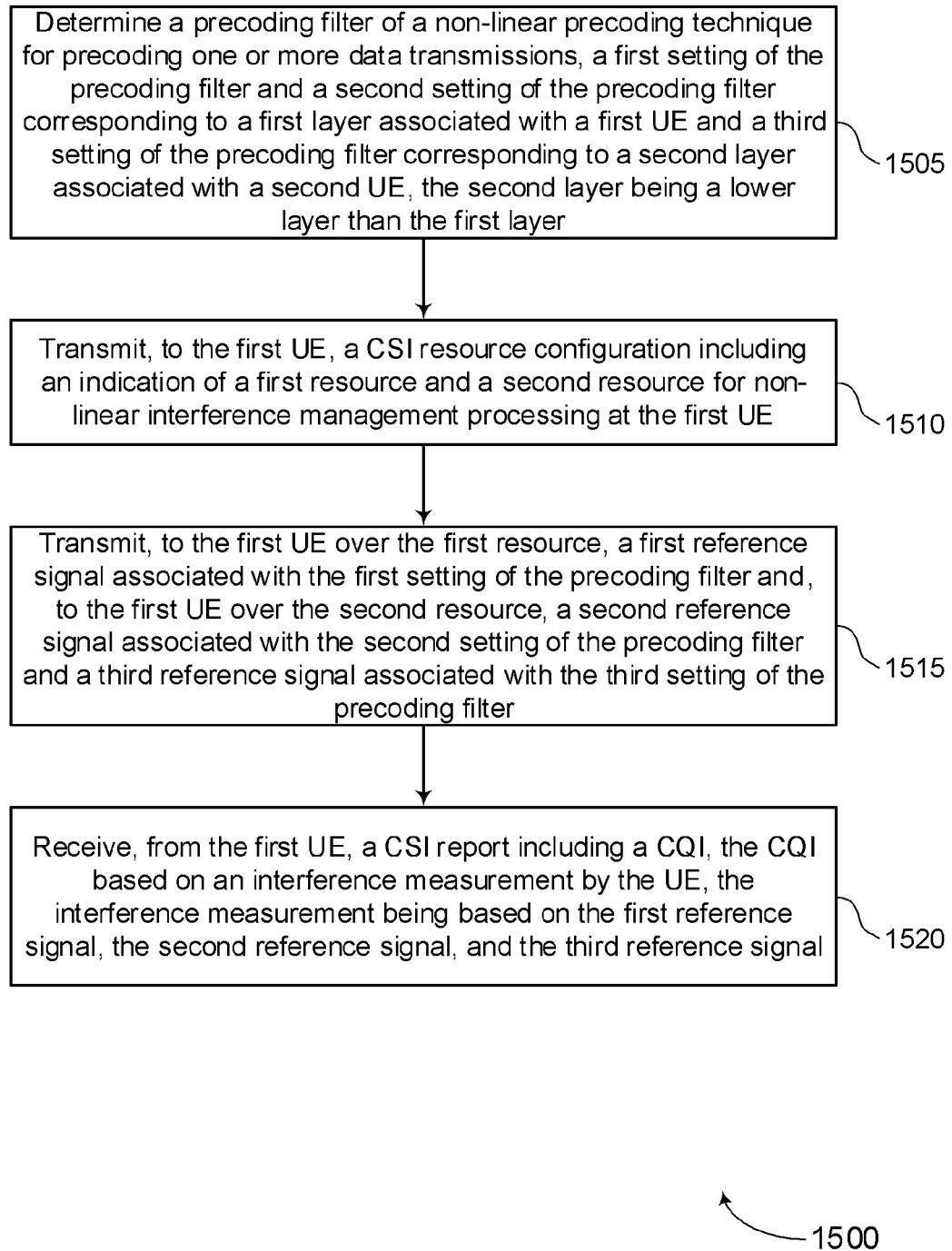

FIG. 15 shows a flowchart illustrating a method 1500 that supports inter-stream interference measurement for non-linear precoding techniques in accordance with aspects of the present disclosure. The operations of method 1500 may be implemented by a base station 105 or its components. For example, the operations of method 1500 may be performed by a communications manager as described with reference to FIGS. 9-12. In some examples, a base station may execute a set of instructions to control the functional elements of the base station to perform the functions described herein. Additionally or alternatively, a base station may perform aspects of the functions described herein using special-purpose hardware.

At 1505, the base station may determine a precoding filter of a non-linear precoding technique for precoding one or more data transmissions, a first setting of the precoding filter and a second setting of the precoding filter corresponding to a first layer associated with a first UE and a third setting of the precoding filter corresponding to a second layer associated with a second UE, the second layer being a lower layer than the first layer. The operations of 1505 may be performed according to the methods described herein. In some examples, aspects of the operations of 1505 may be performed by a precoding component as described with reference to FIGS. 9-12.

At 1510, the base station may transmit, to the first UE, a CSI resource configuration including an indication of a first resource and a second resource for non-linear interference management processing at the first UE. The operations of 1510 may be performed according to the methods described herein. In some examples, aspects of the operations of 1510 may be performed by a CSI configuration component as described with reference to FIGS. 9-12.

At 1515, the base station may transmit, to the first UE over the first resource, a first reference signal associated with the first setting of the precoding filter and, to the first UE over the second resource, a second reference signal associated with the second setting of the precoding filter and a third reference signal associated with the third setting of the precoding filter. The operations of 1515 may be performed according to the methods described herein. In some examples, aspects of the operations of 1515 may be performed by a reference signal component as described with reference to FIGS. 9-12.

At 1520, the base station may receive, from the first UE, a CSI report including a CQI, the CQI based on an interference measurement by the UE, the interference measurement being based on the first reference signal, the second reference signal, and the third reference signal. The operations of 1520 may be performed according to the methods described herein. In some examples, aspects of the operations of 1520 may be performed by a CSI reporting component as described with reference to FIGS. 9-12.

Figure 16:
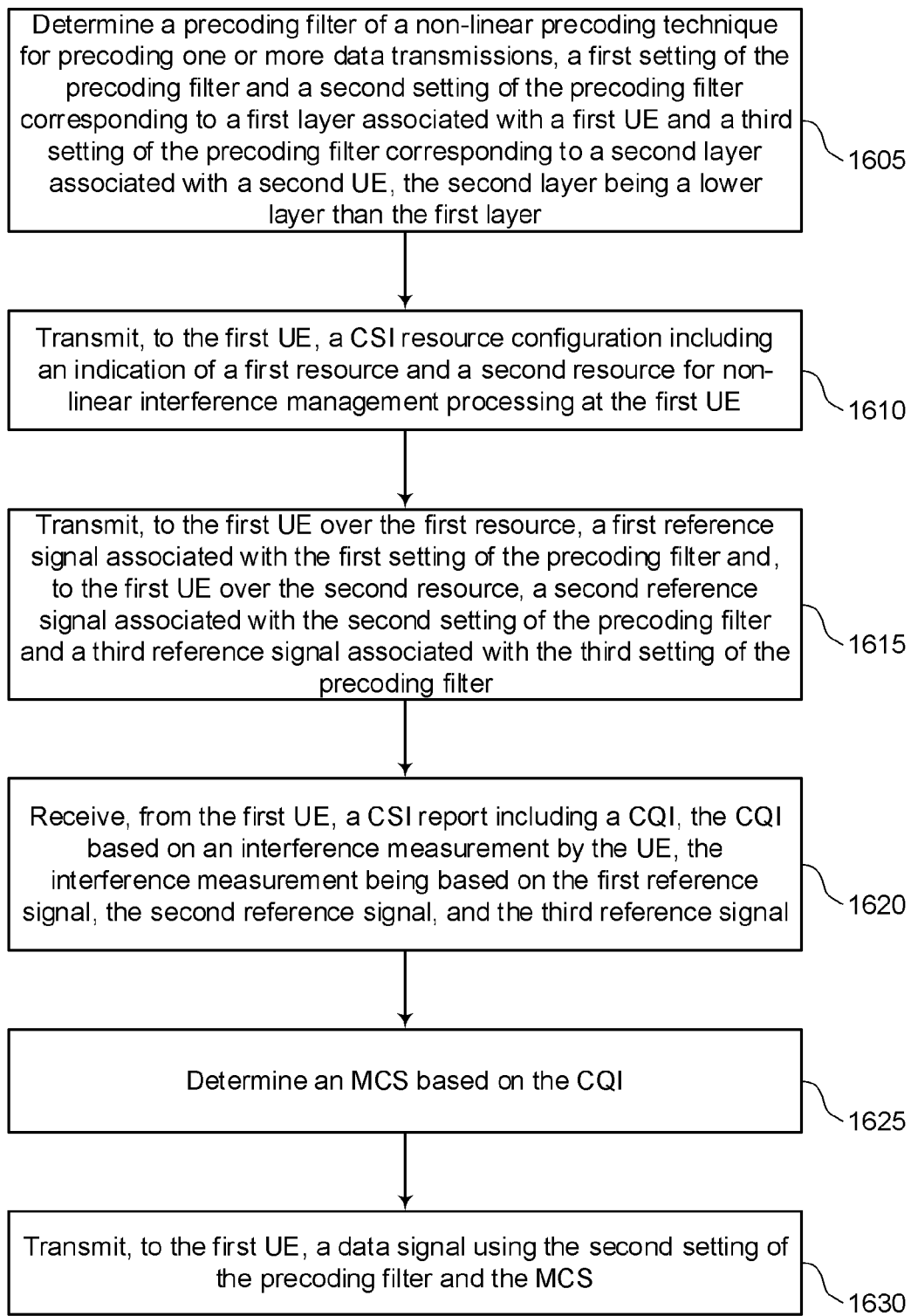

FIG. 16 shows a flowchart illustrating a method 1600 that supports inter-stream interference measurement for non-linear precoding techniques in accordance with aspects of the present disclosure. The operations of method 1600 may be implemented by a base station 105 or its components. For example, the operations of method 1600 may be performed by a communications manager as described with reference to FIGS. 9-12. In some examples, a base station may execute a set of instructions to control the functional elements of the base station to perform the functions described herein.

Additionally or alternatively, a base station may perform aspects of the functions described herein using special-purpose hardware.

At 1605, the base station may determine a precoding filter of a non-linear precoding technique for precoding one or more data transmissions, a first setting of the precoding filter and a second setting of the precoding filter corresponding to a first layer associated with a first UE and a third setting of the precoding filter corresponding to a second layer associated with a second UE, the second layer being a lower layer than the first layer. The operations of 1605 may be performed according to the methods described herein. In some examples, aspects of the operations of 1605 may be performed by a precoding component as described with reference to FIGS. 9-12.

At 1610, the base station may transmit, to the first UE, a CSI resource configuration including an indication of a first resource and a second resource for non-linear interference management processing at the first UE. The operations of 1610 may be performed according to the methods described herein. In some examples, aspects of the operations of 1610 may be performed by a CSI configuration component as described with reference to FIGS. 9-12.

At 1615, the base station may transmit, to the first UE over the first resource, a first reference signal associated with the first setting of the precoding filter and, to the first UE over the second resource, a second reference signal associated with the second setting of the precoding filter and a third reference signal associated with the third setting of the precoding filter. The operations of 1615 may be performed according to the methods described herein. In some examples, aspects of the operations of 1615 may be performed by a reference signal component as described with reference to FIGS. 9-12.

At 1620, the base station may receive, from the first UE, a CSI report including a CQI, the CQI based on an interference measurement by the UE, the interference measurement being based on the first reference signal, the second reference signal, and the third reference signal. The operations of 1620 may be performed according to the methods described herein. In some examples, aspects of the operations of 1620 may be performed by a CSI reporting component as described with reference to FIGS. 9-12.

At 1625, the base station may determine an MCS based on the CQI. The operations of 1625 may be performed according to the methods described herein. In some examples, aspects of the operations of 1625 may be performed by a MCS component as described with reference to FIGS. 9-12.

At 1630, the base station may transmit, to the first UE, a data signal using the second setting of the precoding filter and the MCS. The operations of 1630 may be performed according to the methods described herein. In some examples, aspects of the operations of 1630 may be performed by a communications component as described with reference to FIGS. 9-12.

It is be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
    receiving, from a network device, a channel state information resource configuration comprising an indication of a first resource and a second resource for non-linear interference management processing;
    receiving, from the network device over the first resource, a first reference signal associated with a first setting of a precoding filter and, from the network device over the second resource, a second reference signal associated with a second setting of the precoding filter and a third reference signal associated with a third setting of the precoding filter, the first setting of the precoding filter and the second setting of the precoding filter corresponding to a first layer associated with the first UE and the third setting of the precoding filter corresponding to a second layer associated with a second UE, the second layer being a lower layer than the first layer;
    determining, based at least in part on interference arising from the second layer associated with the second UE, an interference measurement at the first UE based at least in part on the first reference signal, the second reference signal, and the third reference signal; and
    communicating with the network device based at least in part on the interference measurement.

2. The method of claim 1, wherein determining the interference measurement at the first UE based at least in part on the first reference signal, the second reference signal, and the third reference signal comprises:
    determining a first signal strength associated with the first reference signal based at least in part on receiving the first reference signal over the first resource; and
    determining a second signal strength associated with a combination of the second reference signal and the third reference signal based at least in part on receiving the second reference signal and the third reference signal over the second resource, wherein determining the interference measurement is based at least in part on the first signal strength and the second signal strength.

3. The method of claim 2, wherein determining the interference measurement further comprises subtracting the first signal strength from the second signal strength.

4. The method of claim 2, wherein determining the interference measurement further comprises:
    determining an estimation result on an auxiliary matrix based at least in part on determining the second signal strength; and
    subtracting the estimation result from the second signal strength.

5. An apparatus for wireless communication at a first user equipment (UE), comprising:
    one or more processors; and
    one or more memories coupled with the one or more processors and storing instructions executable by the one or more processors to cause the apparatus to:
        receive, from a network device, a channel state information resource configuration comprising an indication of a first resource and a second resource for non-linear interference management processing;
        receive, from the network device over the first resource, a first reference signal associated with a first setting of a precoding filter and, from the network device over the second resource, a second reference signal associated with a second setting of the precoding filter and a third reference signal associated with a third setting of the precoding filter, the first setting of the precoding filter and the second setting of the precoding filter corresponding to a first layer associated with the first UE and the third setting of the precoding filter corresponding to a second layer associated with a second UE, the second layer being a lower layer than the first layer;
        determine, based at least in part on interference arising from the second layer associated with the second UE, an interference measurement at the first UE based at least in part on the first reference signal, the second reference signal, and the third reference signal; and
        communicate with the network device based at least in part on the interference measurement.

6. The apparatus of claim 5, wherein the instructions to determine the interference measurement at the first UE based at least in part on the first reference signal, the second reference signal, and the third reference signal are executable by the one or more processors to cause the apparatus to:
   determine a first signal strength associated with the first reference signal based at least in part on receiving the first reference signal over the first resource; and
   determine a second signal strength associated with a combination of the second reference signal and the third reference signal based at least in part on receiving the second reference signal and the third reference signal over the second resource, wherein determining the interference measurement is based at least in part on the first signal strength and the second signal strength.

7. The apparatus of claim 6, wherein the instructions to determine the interference measurement are further executable by the one or more processors to cause the apparatus to subtract the first signal strength from the second signal strength.

8. The apparatus of claim 6, wherein the instructions to determine the interference measurement are further executable by the one or more processors to cause the apparatus to:
   determine an estimation result on an auxiliary matrix based at least in part on determining the second signal strength; and
   subtract the estimation result from the second signal strength.

9. The apparatus of claim 5, wherein the instructions are further executable by the one or more processors to cause the apparatus to:
   determine a signal-to-interference-plus-noise ratio based at least in part on the interference measurement; and
   determine a channel quality indicator based at least in part on the signal-to-interference-plus-noise ratio, wherein communicating with the network device is based at least in part on the channel quality indicator.

10. The apparatus of claim 9, wherein the instructions are further executable by the one or more processors to cause the apparatus to transmit, to the network device, a channel state information report comprising the channel quality indicator based at least in part on the channel state information resource configuration.

11. The apparatus of claim 10, wherein the instructions to communicate with the network device based at least in part on the interference measurement are executable by the one or more processors to cause the apparatus to receive, from the network device, a data signal associated with the second setting of the precoding filter and a modulation and coding scheme, the modulation and coding scheme based at least in part on the channel quality indicator.

12. The apparatus of claim 5, wherein the instructions to receive the third reference signal over the second resource are executable by the one or more processors to cause the apparatus to receive a plurality of symbols of the third reference signal over a plurality of ports of the second resource, each symbol of the plurality of symbols corresponding to one port of the plurality of ports.

13. The apparatus of claim 5, wherein the channel state information resource configuration comprises an indication of a third resource for linear interference management processing, and the instructions are further executable by the one or more processors to cause the apparatus to:
   receive, from the network device over the third resource, a fourth reference signal associated with a fourth setting of the precoding filter, wherein the fourth setting of the precoding filter corresponds to a third layer associated with a third UE, the third layer being a higher layer than the first layer; and
   determine, based at least in part on interference arising from the third layer associated with the third UE, a second interference measurement at the first UE based at least in part on the fourth reference signal, wherein communicating with the network device is based at least in part on the second interference measurement.

14. The apparatus of claim 5, wherein the instructions are further executable by the one or more processors to cause the apparatus to transmit, to the network device, a sounding reference signal for determining a channel matrix associated with the first UE or an indication of the channel matrix associated with the first UE, wherein the precoding filter is based at least in part on the channel matrix associated with the first UE.

15. The apparatus of claim 5, wherein the first reference signal is a non-zero power channel state information reference signal and the second reference signal and the third reference signal are non-zero power channel state information reference signals for interference measurement.

16. The apparatus of claim 5, wherein the second reference signal and the third reference signal are associated with a non-linear precoding.

17. The apparatus of claim 5, wherein the precoding filter comprises a backward filter associated with a non-linear precoding technique, and wherein the second setting of the precoding filter comprises an interference cancelation and a modulo operation based at least in part on the backward filter, the interference cancelation comprising subtracting an interference associated with the third setting of the precoding filter from the first setting of the precoding filter based at least in part on the backward filter.

18. The apparatus of claim 17, wherein the modulo operation comprises adding an auxiliary matrix, wherein a value of an element of the auxiliary matrix is based at least in part on a multiplication of a modulation constellation size of the first reference signal and an integer, the modulo operation comprising determining an absolute value of the second reference signal, wherein the absolute value of the second reference signal is less than or equal to the modulation constellation size of the first reference signal.

19. The apparatus of claim 5, wherein the precoding filter comprises a forward filter associated with a non-linear precoding technique, and wherein a setting of the precoding filter comprises a subset of a precoding matrix associated with the forward filter, the precoding filter comprising a quantity of settings, each setting of the quantity of settings corresponding to a respective layer.

20. An apparatus for wireless communication at a network device, comprising:
   one or more processors; and
   one or more memories coupled with the one or more processors and storing instructions executable by the one or more processors to cause the apparatus to:
      determine a precoding filter of a non-linear precoding technique for precoding one or more data transmissions, a first setting of the precoding filter and a second setting of the precoding filter corresponding to a first layer associated with a first user equipment (UE) and a third setting of the precoding filter corresponding to a second layer associated with a second UE, the second layer being a lower layer than the first layer;
      transmit, to the first UE, a channel state information resource configuration comprising an indication of a first resource and a second resource for non-linear interference management processing at the first UE;

transmit, to the first UE over the first resource, a first reference signal associated with the first setting of the precoding filter and, to the first UE over the second resource, a second reference signal associated with the second setting of the precoding filter and a third reference signal associated with the third setting of the precoding filter; and receive, from the first UE, a channel state information report comprising a channel quality indicator, the channel quality indicator based at least in part on an interference measurement by the first UE, the interference measurement being based at least in part on the first reference signal, the second reference signal, and the third reference signal.

* * * * *